US010504358B2

(12) United States Patent
Sayavong et al.

(10) Patent No.: US 10,504,358 B2
(45) Date of Patent: Dec. 10, 2019

(54) SIMPLIFIED USER INTERACTION WITH INTRUSION SYSTEMS BASED ON IDENTIFIED PRESENCE DETECTION

(71) Applicant: TYCO SAFETY PRODUCTS CANADA LTD., Concord (CA)

(72) Inventors: Rajmy Sayavong, Hamilton (CA); Gregory W. Hill, Newmarket (CA); David J. LeBlanc, Uxbridge, MA (US); Samuel D. Rosewall, Jr., Carlsbad, CA (US); Gerald M. Bluhm, Acton, CA (US); Michael DeRose, IV, Douglas, MA (US); Rob Vandervecht, Acton (CA)

(73) Assignee: TYCO SAFETY PRODUCTS CANADA LTD., Concord, Ontario (CA)

( * ) Notice: Subject to any disclaimer, the term of this patent is extended or adjusted under 35 U.S.C. 154(b) by 0 days.

(21) Appl. No.: 15/279,815

(22) Filed: Sep. 29, 2016

(65) Prior Publication Data
US 2017/0018159 A1    Jan. 19, 2017

Related U.S. Application Data

(63) Continuation of application No. 15/151,613, filed on May 11, 2016.
(Continued)

(51) Int. Cl.
*G08B 29/18* (2006.01)
*G08B 13/24* (2006.01)
(Continued)

(52) U.S. Cl.
CPC ......... *G08B 29/188* (2013.01); *G06F 16/245* (2019.01); *G06F 16/951* (2019.01);
(Continued)

(58) Field of Classification Search
CPC ............. G08B 13/19613; G08B 31/00; G08B 13/19652; G08B 13/19671; G08B 13/22;
(Continued)

(56) References Cited

U.S. PATENT DOCUMENTS

| 5,991,429 A | 11/1999 | Coffin et al. |
| 8,456,293 B1 | 6/2013 | Trundle |

(Continued)

FOREIGN PATENT DOCUMENTS

| GB | 2496196 A | 5/2013 |

OTHER PUBLICATIONS

International Search Report & Written Opinion, PCT/US15/51852.
(Continued)

*Primary Examiner* — Emily C Terrell
(74) *Attorney, Agent, or Firm* — Arent Fox LLP

(57) ABSTRACT

A unified presence detection and prediction platform that is privacy aware is described. The platform is receives signals from plural sensor devices that are disposed within a premises. The platform produces profiles of entities based on detected characteristics developed from relatively inexpensive and privacy-aware sensors, i.e., non-video and non-audio sensor devices. The platform using these profiles and sensor signals from relatively inexpensive and privacy-aware sensors determines specific identification and produces historical patterns. Also described are techniques that allow users (persons), when authorized, to control remote devices/systems generally without direct interaction with such systems merely by the systems detecting and in instances predicting the specific presence of an identified individual in a location within the premises.

21 Claims, 20 Drawing Sheets

Related U.S. Application Data

(60) Provisional application No. 62/160,772, filed on May 13, 2015.

(51) Int. Cl.
| | |
|---|---|
| *H04W 4/38* | (2018.01) |
| *G06F 16/245* | (2019.01) |
| *G06F 16/951* | (2019.01) |
| *G06F 21/31* | (2013.01) |
| *G08B 13/00* | (2006.01) |
| *H04L 29/08* | (2006.01) |

(52) U.S. Cl.
CPC .............. *G06F 21/31* (2013.01); *G08B 13/00* (2013.01); *G08B 13/2491* (2013.01); *G08B 29/185* (2013.01); *H04L 67/12* (2013.01); *H04W 4/38* (2018.02); *H04L 67/24* (2013.01)

(58) Field of Classification Search
CPC ................ G08B 13/00; G08B 13/1967; G08B 21/0236; G08B 21/0238; G08B 25/001; G08B 25/008; G08B 25/009; G08B 25/10; G08B 29/20; G08B 13/16; G08B 13/1645; G08B 13/19; G08B 13/19656; G08B 13/2494; G08B 19/005; G08B 21/0225; G08B 21/22; G08B 29/185; H04N 21/4532; H04N 21/44218; H04N 21/42201; H04N 21/4524; G06K 2009/00738; G06K 9/00718; G06K 9/00771
USPC .................................. 340/541, 5.3
See application file for complete search history.

(56) References Cited

U.S. PATENT DOCUMENTS

| | | | |
|---|---|---|---|
| 8,493,202 B1 | 7/2013 | Trundle | |
| 8,520,072 B1 | 8/2013 | Slavin | |
| 8,525,665 B1 | 9/2013 | Trundle | |
| 8,659,417 B1 | 2/2014 | Trundle | |
| 8,675,071 B1 | 3/2014 | Slavin | |
| 8,810,657 B1 | 8/2014 | Slavin | |
| 8,937,661 B1 | 1/2015 | Slavin | |
| 9,509,688 B1 | 11/2016 | Magi Shaashua et al. | |
| RE46,310 E | 2/2017 | Hoffberg et al. | |
| 2002/0147982 A1 | 10/2002 | Naidoo | |
| 2003/0062997 A1 | 4/2003 | Naidoo | |
| 2003/0117280 A1 | 6/2003 | Prehn | |
| 2003/0210139 A1 | 11/2003 | Brooks et al. | |
| 2004/0113770 A1 | 6/2004 | Falk | |
| 2005/0068165 A1* | 3/2005 | Kelliher | G07C 9/00166 340/523 |
| 2005/0239545 A1 | 10/2005 | Rowe | |
| 2006/0293100 A1 | 12/2006 | Walter | |
| 2006/0294565 A1 | 12/2006 | Walter | |
| 2007/0001835 A1* | 1/2007 | Ward | G07C 9/00111 340/522 |
| 2007/0241863 A1 | 10/2007 | Udagawa et al. | |
| 2007/0290830 A1 | 12/2007 | Gurley | |
| 2008/0272910 A1 | 11/2008 | Anderson | |
| 2009/0022362 A1 | 1/2009 | Gagvani | |
| 2011/0057796 A1 | 3/2011 | Candelore | |
| 2011/0102171 A1* | 5/2011 | Raji | G08B 25/008 340/539.11 |
| 2011/0254680 A1 | 10/2011 | Perkinson | |
| 2011/0254681 A1 | 10/2011 | Perkinson | |
| 2012/0066707 A1 | 3/2012 | Poder | |
| 2012/0084857 A1 | 4/2012 | Hubner | |
| 2012/0154126 A1* | 6/2012 | Cohn | H04L 12/2827 340/10.51 |
| 2012/0169487 A1 | 7/2012 | Poder | |
| 2013/0278422 A1 | 10/2013 | Friedman | |
| 2013/0307682 A1* | 11/2013 | Jerhotova | G06F 17/2785 340/521 |
| 2014/0070959 A1 | 3/2014 | Bhargava et al. | |
| 2014/0140590 A1 | 5/2014 | Wilson et al. | |
| 2014/0232861 A1 | 8/2014 | Naidoo | |
| 2014/0253321 A1 | 9/2014 | Srinivasan | |
| 2014/0266681 A1 | 9/2014 | Dunn | |
| 2014/0266699 A1 | 9/2014 | Poder | |
| 2014/0309805 A1 | 10/2014 | Ricci | |
| 2014/0313032 A1* | 10/2014 | Sager | H04Q 9/00 340/539.17 |
| 2014/0320280 A1 | 10/2014 | Sager et al. | |
| 2015/0033246 A1 | 1/2015 | Gideon | |
| 2015/0096352 A1* | 4/2015 | Peterson | F24F 11/30 73/31.02 |
| 2015/0187192 A1* | 7/2015 | Tabe | H04N 21/814 340/541 |
| 2016/0127931 A1 | 5/2016 | Baxley et al. | |
| 2016/0189510 A1 | 6/2016 | Hutz | |
| 2016/0210832 A1 | 7/2016 | Williams | |

OTHER PUBLICATIONS

Office Action for U.S. Appl. No. 15/151,613, dated Jun. 1, 2018, 29 pages.
Office Action for U.S. Appl. No. 15/279,736, dated Jul. 13, 2018, 32 pages.
Office Action for U.S. Appl. No. 15/279,776, dated Aug. 30, 2018, 22 pages.
United States Non-Final Office Action dated Jan. 30, 2019 issued in co-pending U.S. Appl. No. 15/151,613.
United States Non-Final Office Action dated Feb. 28, 2019 issued in co-pending U.S. Appl. No. 15/279,736.
United States Final Office Action dated Mar. 8, 2019 issued in co-pending U.S. Appl. No. 15/279,776.
United States Final Office Action dated May 17, 2019 issued in co-pending U.S. Appl. No. 15/279,736.
United States Non-Final Office Action dated Jun. 7, 2019 issued in co-pending U.S. Appl. No. 15/279,776.
United States Notice of Allowance dated Sep. 18, 2019 issued in co-pending U.S. Appl. No. 15/279,776.

* cited by examiner

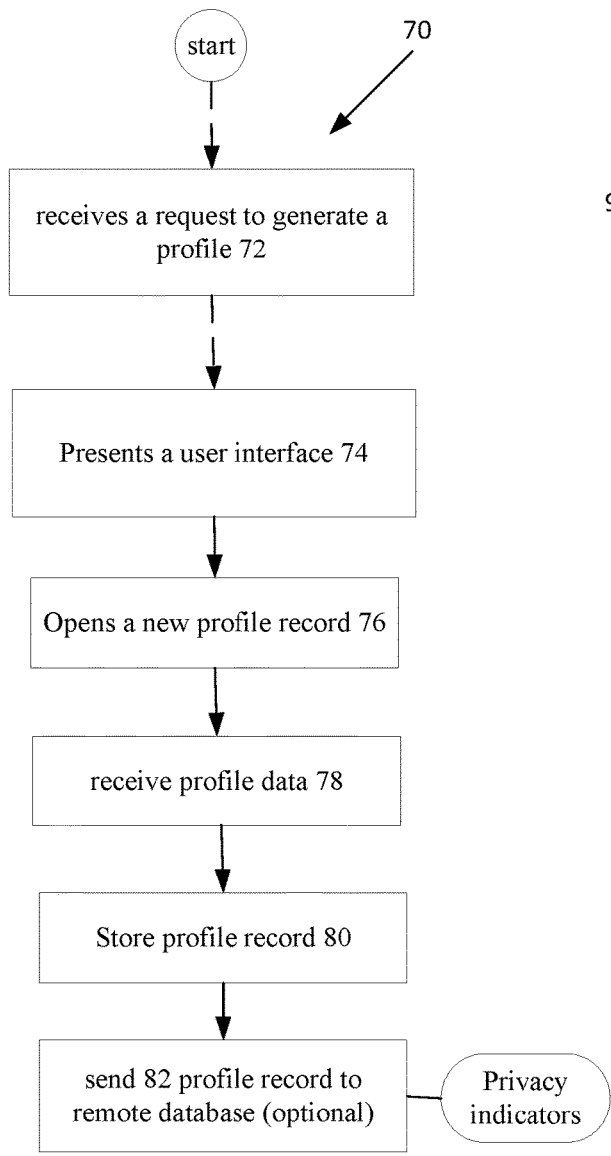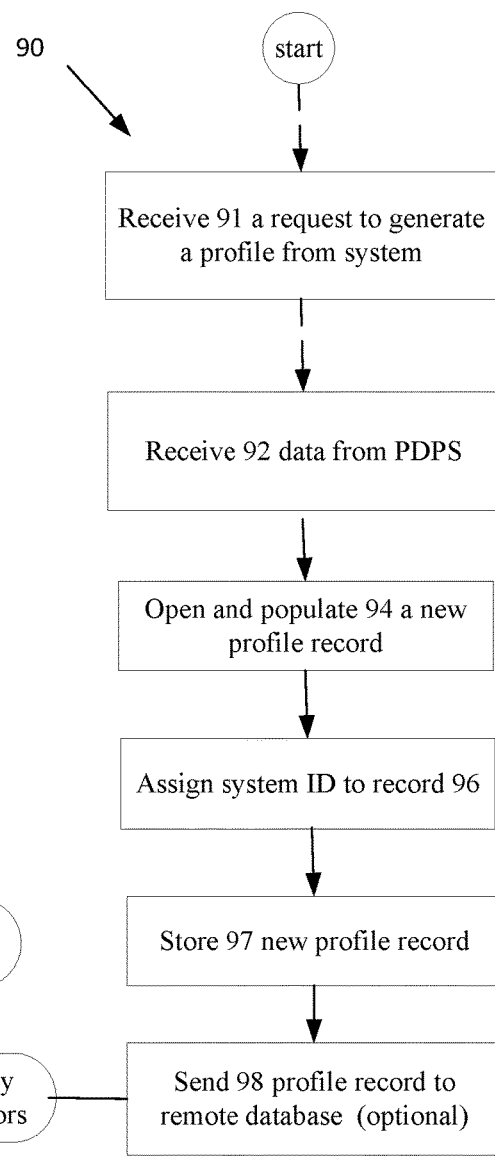
FIG. 3A
FIG. 3B

SIMPLIFIED USER INTERACTION WITH INTRUSION SYSTEMS BASED ON IDENTIFIED PRESENCE DETECTION

CLAIM OF PRIORITY

This application is a Continuation Application of and claims priority under 35 U.S.C. § 120 to U.S. patent application Ser. No. 15/151,613 filed May 11, 2016, entitled: "IDENTIFIED PRESENCE DETECTION IN AND AROUND PREMISES", the entire contents of which are hereby incorporated by reference, and which in turn claims priority under 35 U.S.C. § 119(e) to provisional U.S. Patent Application 62/160,772, filed on May 13, 2015, entitled: "IDENTIFIED PRESENCE DETECTION IN AND AROUND PREMISES", the entire contents of which are hereby incorporated by reference.

BACKGROUND

This description relates systems that detect presence of entities in an environment through electronic sensors.

It is common for persons to interact with electronic devices that require user input to control. Such user devices are ubiquitous and determining presence from such interactions are relatively straightforward. One example is a portable electronic device with GPS. With such devices it is possible to detect the location and hence in a sense presence of an individual in a specific location. Commercial/residential surveillance and/or intrusion and/or alarm systems have sensors to detect the presence of conditions at a premises through processing of various types of signals from detector/sensor devices either by a local processing station, e.g., an intrusion panel and/or at a central monitoring station. Moreover, commercial/residential surveillance systems in particular include electronic cameras, e.g., video cameras that send data such as video data from such cameras to, e.g., a central monitoring station, where such data can be analyzed.

Such sensors are generally low cost and often prone to producing conditions that can result in false alarms.

SUMMARY

One of the major limitations of traditional approaches to detecting presence is that absent relatively sophisticated techniques and/or specific user interaction with systems, it is generally not cost-effective in many environments, e.g., a home, to detect presence of specific individuals and recognize the specific individuals presence by use of relatively inexpensive sensors, such as found in already installed surveillance and/or intrusion and/or alarm systems or as a byproduct of such surveillance and/or intrusion and/or alarm systems. In addition certain types of approaches, e.g., video and audio approaches can be rather intrusive from a privacy perspective.

Aspects include methods, systems and computer program products stored on physical, computer readable hardware devices that can include various types of computer storage devices including memory and disk storage, features of which are set forth in the claims.

An aspect involves a system to determine specific presence of an identified entity, the system including a plurality of non-video and non-audio sensor devices disposed in a premises, a computing system comprising a processor and memory that are configured to receive signals from at least some of the plurality of sensor devices in response an entity moving through the premises and retrieve profile records of entities having established profiles on the system, with each profile storing corresponding identification information of an entity associated with the profile and parameter information of characteristics associated with the corresponding entity. The system for each profile is configured to determine from the signals received from the sensors corresponding parameters, determine a number of sufficiently close matches of the determined parameters to parameter information from retrieved profile records, and select from the retrieved profile one of the profiles having the highest number of determined number of sufficiently close matches as the specifically identified entity.

The following are some additional features of the above aspect.

The system is further configured to process the signals from the sensors to determine presence of a moving object and to determine parameter values associated with the moving object. The system is further configured to produce a profile record populated with the determined parameter values associated with the moving object, when each of the retrieved profile records have no matching parameters. The sensor device types are selected from the group consisting of motion detectors, glass break detectors, noxious gas sensors, smoke/fire detectors, contact/proximity switches, temperature sensors, vibration sensors, air movement/pressure sensors, chemical/electro-chemical sensors, weight sensors, global positioning system transceivers, optical detectors, biometric sensors, EGG/Heartbeat sensors in wearable computing garments, network hotspots, and r.f. detectors. The computing system is further configured to determine which profile record or records have above a threshold number of closely matching parameter values, and when plural profile records have above the threshold number of closely matching parameter values, determine which profile record has a highest number of matching parameter values. The profile record is a first profile record and the computing device is further configured to receive a request to generate a profile, receive user inputs of user personal information, produce a second profile record from the data received from the user, and store the second profile record.

An additional aspect involves a system including plural sensor devices, a computing device, configured to receive signals from the plural sensor devices, retrieve a profile of an entity from a data store, retrieve movement flow records from the data store, the movement flow records comprising data from one or more sensors and temporal information regarding time and day of collection, analyze the retrieved movement flow records according to a historical pattern rule to determine from the sensor signal data and the temporal information, a set of sensors that satisfy for the retrieved profile the historical pattern rule, construct a representation of the set of sensors that corresponds to an order and relationship of sensors encountered by the entity associated with the movement records.

The following are some additional features of the above aspect.

The representation is a graph structure that includes a set of nodes corresponding to sensors and a set of connecting lines that establish relationships between the nodes. The representation is a graph structure that includes information associated with each node and edge of the graph. The computer system is further configured to produce an historical pattern record. The computer system is further configured to produce an historical pattern record that includes a reference to the representation of the set of sensors, a profile ID corresponding to the profile and a Rule ID. The produced historical pattern record further includes a data field comprising supplementary data. The analysis applies a pattern recognition algorithm to analyze the retrieved movement flow records to determine a historical pattern from the movement flow records. The system is further configured to determine a location of a user from signals sent from one or more of the sensor devices, determine from signals sent by the one or more sensor devices, an identity of the user, retrieve from the database one or more patterns corresponding to an action predicted by the system to be performed by the identified user, and send control signals corresponding to determined control actions to the one or more systems/devices to perform the determined control action by the systems/devices. The system has a first one of the one or more control devices is a panel for an alarm/security system, the system further configured to authenticate the user for accessing and performing the control action on the panel. The system is further configured to process received sensor data from the sensor devices to establish identity of a specific person in the premises, retrieve information regarding restrictions placed on the specific individual in the premises, process sensor data from one or more of the sensor devices against restrictions to determine noncompliance with the restriction, and form a message regarding noncompliance with the restriction to send to a user device. The data uses presence information collected from sensors for pet detection or monitoring family members. The system is configured to receive a request for operating in an activity replication learning mode for one or more specific periods of time. The constructed representation represents a historical pattern of actions performed by one or more individuals over specified one or more periods of time, with the system configured to produce a listing of actions performed by the one or more individuals over the specific one or more periods of time, produce control messages according to the listing to control devices and or systems within the premises, and send the control messages according to a sequence in the listing to control the devices and or systems within the premises.

An additional aspect involves a system for determining occurrences of false alarms triggered by an intrusion detection system. The system includes a computing device including a processor device and memory, the computing device configure to receive data from a plurality of non-video and non-audio sensor devices, receive an assertion of an alarm condition from an intrusion detection system, process the received sensor data from the plurality of sensor devices to detect presence of a moving object within a specific location, retrieve from a database profile records of expected entities in the premises, determine one or more matches of physical attributes from the profiles to detected physical attributes provided by detection of presence from the sensor data, determine from presence or absence of matches whether to confirm assertion the alarm condition from the intrusion detection system, and send the determined confirmation to the intrusion detection system.

The following are some additional features of the above aspect.

The system is configured to produce by a profile system a new profile that is populated with data received from the plurality of non-video and non-audio sensor devices, when there are no matches. The system is configured to send a message to the intrusion detection panel system when confirmation of an alarm condition is determined to cause the intrusion detection system to issue the alarm. The system is configured to provide an indication of what triggered the alarm. The system, based on the processing of the profile and presence information, determines that the alarm was triggered by movement of a family pet or the presence of authorized persons in the premises the system, sends to the intrusion detection system a message to retire the assertion of the alarm. The system, based on the processing of the profile and presence information, confirms the assertion of the alarm when the system detects the presence of unidentified or unauthorized individuals. The determined confirmation is used an input in processing of potential alarm conditions by the intrusion detection system. The system stores the event for subsequent assertion based on a confirmation from other sensors.

An additional aspect involves a system including an intrusion detection system that includes a computing device that receives data from plural non-video and non-audio sensor devices, the computing device configure to detect intrusions into a premises being protected by the intrusion detection system, a presence detection system operatively coupled to the intrusion detection system, the presence detection system configured to identify a current location of a user in the premises, retrieve stored profile data and historical pattern records associated with the profile, retrieve premises profile data that specifies locations of various sensors, layouts of rooms, equipment in the premises, devices/systems that can be electronically controlled, IP addresses of such system/devices, determine actions that the user is authorized to perform to control the intrusion detection system and other equipment, devices, systems in the premises based on the determined location, the retrieved historical records and the retrieved profile records.

The following are some additional features of the above aspect.

The system is configured to send actions that control the other equipment, devices, and systems to a user device. The system is configured to determine mechanisms available in the current location by which the user can communicate with the presence detection system and enable determined mechanism in the determined location to communicate with the presence detection system. The system is configured to determine identification of the user by stored profile records and received sensor data for configuring the intrusion system. The system is configured to determine user activity with the determined user activity providing a trigger event to enable user interaction with the intrusion detection system. The enabled user interaction with the intrusion detection system is by voice commands from the user. The system includes a plurality of sensor devices that send the sensor data to the system.

One or more of the above aspects may include one or more of the following advantages.

By combining low cost non-video and non-audio sensor technologies, some aspects can detect presence of specific identifiable individuals, and yet maintain a notion of privacy. In some embodiments, data may leave the person's premises, however, if there is a full streaming audio of conversations (or video of movements) the person might not be so keen about sharing such data. Thus some aspects use a combination of lower-cost technologies (or in some instances higher cost but less intrusive technologies) and signals from these types of sensors on their own may not raise significant privacy concerns.

Aspects include methods, systems and computer program products stored on physical, computer readable hardware devices that can include various types of computer storage devices including memory and disk storage, features of which are set forth in the claims.

The details of one or more embodiments of the inventions are set forth in the accompanying drawings and the description below. Other features, objects, and advantages of the invention are apparent from the description and drawings, and from the claims. Various use cases are discussed herein.

DESCRIPTION OF DRAWINGS

FIGS. 3A-B are flow charts of a profile building process.

DETAILED DESCRIPTION

Described below are techniques that allow users (persons) to control remote devices/systems generally without direct interaction with such systems merely by the systems detecting and in many instances predicting the specific presence of an identified individual in a location. As used herein "specific presence of an identified individual" is defined as the unique presence of an identifiable specific individual that is generally recognized by systems described herein as such described systems are trained. In some implementations/embodiments "specific presence of an identified individual" is further defined by a set of sensor characteristics, which set excludes video and audio sensors, and a system stored profile that is either manually populated by a user entering data into a system or is automatically populated overtime by processing of various sensors excluding video and audio sensors.

For purposes of explanation, sensors in a user's house produce signals that are temporally analyzed by the disclosed electronic systems to develop patterns of behavior. These electronic systems in turn are used to control many features in the house, merely by having detected presence and in certain embodiments, detection of specific presence, i.e., the "specific presence of an identified individual." That is the electronic systems identify presence of a specific individual, being able to distinguish presence of a mother for instance from a child or a father or a visiting adult female.

Some of the many features that can be controlled include locking and unlock doors, arming and disarming a home security system, controlling remote media systems, such as radios, televisions, controlling opening and closing of drapes/blinds, evaluating the condition of mechanical equipment within a premises, detecting ambient environmental conditions through corresponding sensors and based on such detection modify the environment upon detection of specific presence. For instance, an ambient environment sensor, e.g., a light meter could detect low light conditions and the PDPS 40 through a connected lamp having a light-bulb turn that lamp on, and so forth. Constant analysis of an audio signature of a home/facility over time may help detect the onset of changes and/or problems in a facility such as a home or business.

Unified Presence Detection and Prediction Platform

Figure 1:
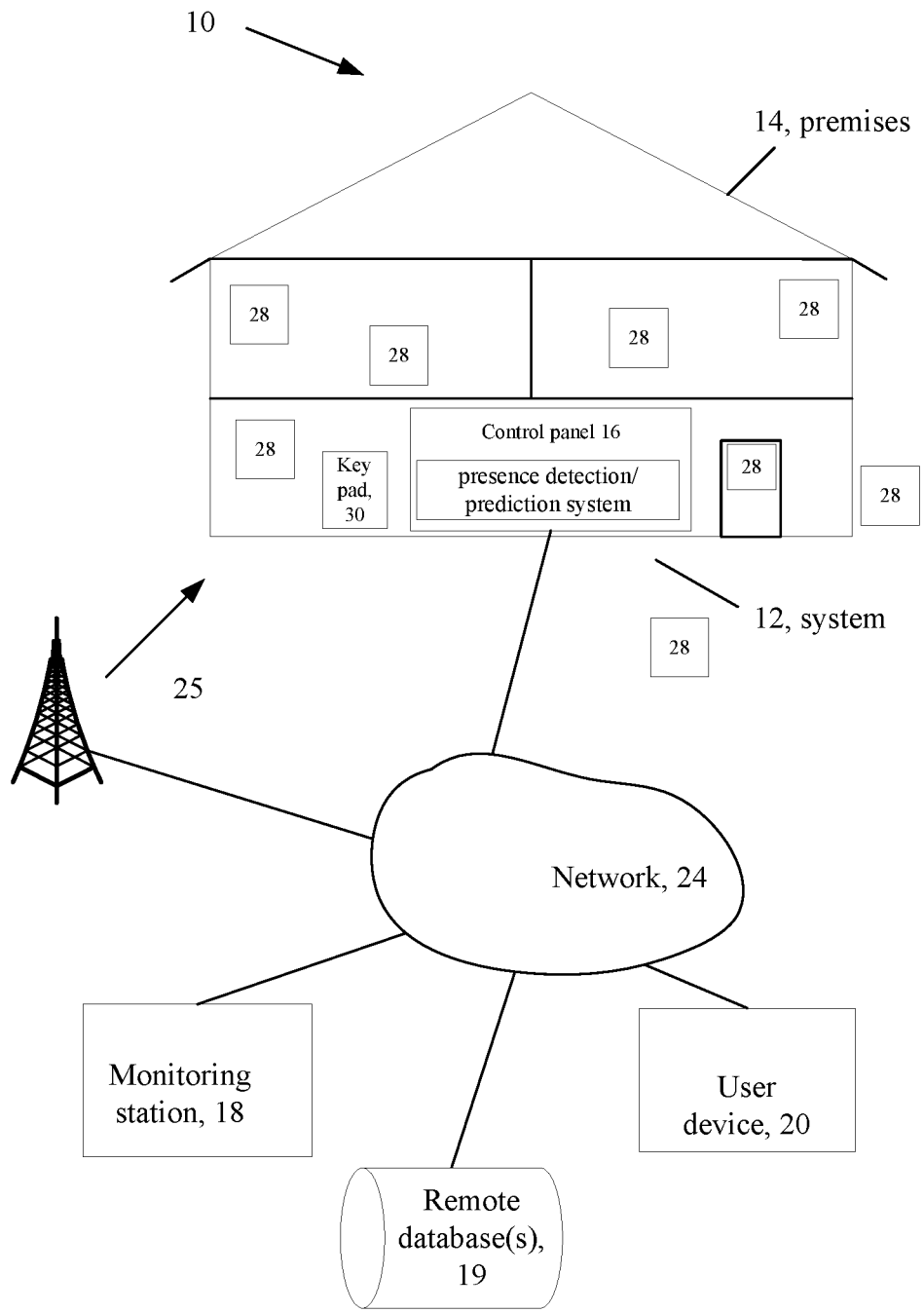
FIG. 1 is a schematic diagram of an example of a security system at a premises.

Referring now to FIG. 1, an arrangement 10 including a security system 12 at a premises 14 is shown. In this arrangement 10, the premises 14 is a residential house, but the premises may alternatively be any type of premises, e.g., commercial buildings, industrial buildings, campuses, etc. The security system 12 includes a control panel 16, sensors/detectors 28 and a keypad 30. The security system 12 is in communication with a central monitoring station 18, remote database 49, and one or more authorized user devices 20 (only one shown) through one or more data networks 24 (only one shown), such as the Internet. The security system can be any one of fire, alarm, access control, surveillance, physical intrusion, etc. types of systems or can be an integrated system that comprises any combination of two or more of such systems.

While the arrangement 10 is described as part of a security system, in some implementations, the arrangement need not be a security system per se but need only be a computing system that receives sensor data and includes processing algorithms to detect specific presence, generates messages based on detected presence, and that outputs the messages to other electronic systems control or otherwise interact with other systems. These other systems can be local and/or remote systems. As an exemplary implementation, however the arrangement will be described in the context of an integrated security system 12 (referred to hereinafter as security system).

In the security system 12, the control panel 16 is in communication with one or more detectors/sensors 28 (many more of which would likely be used than those shown in FIG. 1) and receives information about the status of the monitored premises from the detectors/sensors 28. Examples of detectors/sensors 28 (hereinafter sensors detector are used interchangeably) include motion detectors, glass break detectors, noxious gas sensors, smoke/fire detectors, contact/proximity switches, video sensors, such as camera, audio sensors such as microphones, directional microphones, temperature sensors such as infrared sensors, vibration sensors, air movement/pressure sensors, chemical/electro-chemical sensors, e.g., VOC (volatile organic compound) detectors, weight sensors, LIDAR (technology that measures distance by illuminating a target with a laser and analyzing the reflected light), GPS (global positioning system) receivers, optical, biometric sensors, e.g., retina scan sensors, EGG/Heartbeat sensors in wearable computing garments, network hotspots and other network devices, and others.

Some of these sensors 28 such as motion detectors, video cameras, glass break detectors, noxious gas sensors, smoke/ fire detectors, microphones, contact/proximity switches, network hotspots and other network devices, can be found presently in homes, and are either relatively inexpensive and/or relatively common. Others such as vibration sensors, air movement/pressure sensors, chemical/electro-chemical sensors, VOC, weight sensors, GPS receivers, optical, biometric sensors, e.g., retina scan sensors, EGG/Heartbeat sensors in wearable computing garments, LIDAR, and others would be rarely found in most residential environments today, but may be in commercial/industrial environments.

The sensors 28 may be hardwired to the control panel 16 or may communicate with the control panel 16 wirelessly. The sensors 28 sense the presence of a change in a physical condition, whether the change involves motion, glass breakage, gas leaks, fire, breach of an entry point, temperature, sound, weight, pressure, chemical, among others, and sends sensor information to the control panel 16. Based on the information received from the sensors 28, the control panel 16 determines whether to one or more trigger alarms, e.g., by triggering one or more sirens (not shown) at the premises 14 and/or sending one or more alarm messages to the monitoring station 18 and/or to a user device 20, as would be conventionally done with existing security systems.

However, the control panel 16 also includes hardware and software (collectively referred to as a "presence detection and prediction system 40" that detects and predicts presence of specific individuals and generates messages that control local and remote systems and/or which produce "specific person presence data" that can be used in many different contexts as will be discussed below.

A user may access the control panel 16 to control the security system, e.g., disarm the security system, arm the security system, enter predetermined standards for the control panel 16 to trigger the alarms, stop the alarms that have been triggered, add new sensors, change sensor settings, view the monitoring status in real time, etc. The access can be made directly at the premises 14, e.g., through a keypad 30 connected to the control panel or with other techniques. In some implementations, the control panel 16 may also include a display (not shown) that shows a graphical user interface to assist a user's control of the security system. The display may be a touch screen such that the user may interact with the control panel and the security system directly through the display.

The user may also access the control panel 16 through the user device 20, which can be at or be remote from the premises 14. To allow a user to access the control panel 16 through the user device 20, and to protect the security system from unauthorized accesses, the control panel 16, the monitoring center 18, and/or the user device implements one or more levels of authentication, including user biometric authentication. The authentication(s) can also be based on input from a user, such as a security code or a PIN provided to the user, a password created by the user, and/or an RFID chip provided to the user or a specific gesture or combinations of any of the above.

Presence Detection and Prediction System

Figure 2:
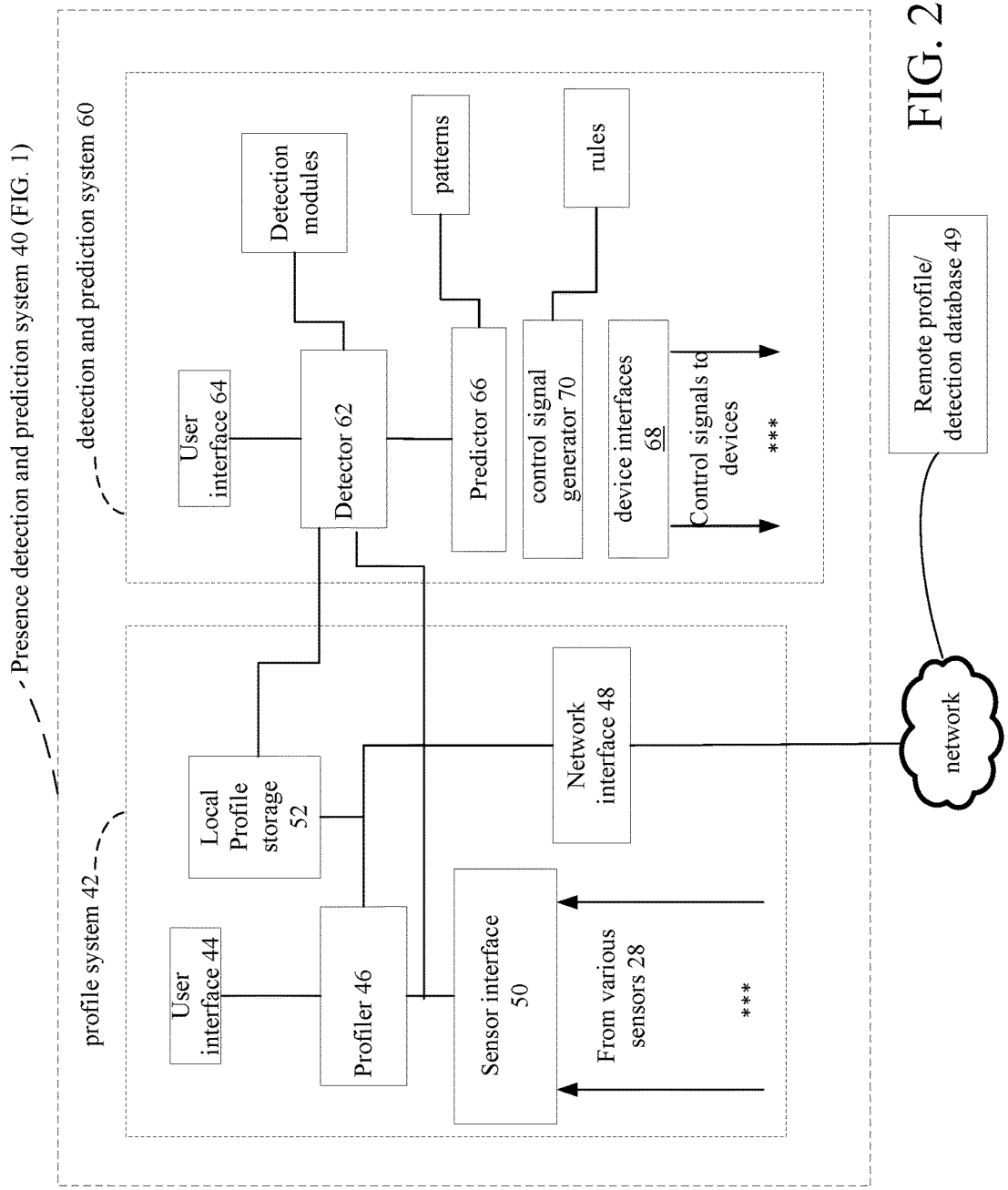
FIG. 2 is a block diagram of a presence detection/prediction and profiling system for detecting presence and building profile information.

Referring now to FIG. 2, a presence detection and prediction system 40 is shown. The presence detection and prediction system 40 is shown as part of the security system 12 inside the control panel 16, but as mentioned above could be a standalone system. The system could be a local system, e.g., on the premises or a remote system. In addition, some aspects could be configure to be locally deployed whereas others could be remotely deployed and one or more aspects of the presence detection and prediction system 40 could be duplicated, meaning that one instance could be locally deployed whereas another could be remotely deployed. The presence detection and prediction system 40 includes a profiling system 42 for processing sensor signals to build profiles and a detection and prediction system 60, which as shown can share circuitry with the profiling system 42.

Profile System

The profiling system 42 includes a user interface 44 that allows a user to input data directly into a profiler 46. In addition, to the user interface 44 and the profiler 46, the profiling system 42 also includes a network interface 48, a sensor interface 50 that receives signals from one or more various sensors 28, and profile storage 52. The profiling system 42 connects to a network 50 over which the profiling system 42 sends/receives information from one or more remote databases 49 (or other systems such as servers not shown). A user can also access the profiling system 42 via a remote or local device, e.g., keypad or keyboard or voice actuation to input person information that will become part of a presence profile, as will be described below.

Detection and Prediction System

The detection and prediction system 60 includes a detector 62 that receives sensor signals, in some implementations accesses profiles from local storage in the profiling system 42, and executes one or more detection modules 62a to detect specific presence of one or more specific entities. The detection and prediction system 60 also includes a user interface 64 that allows a user to input data directly into a detection system 62. In addition, to the user interface 64 and the detector 62, the detection and prediction system 60 also includes at least one and generally several device interfaces 68. The device interfaces 68 receive control signals generated by a control signal generator 67 and configures such control signals to be in an electrical and logical format according to the type of device and/or system to which a specific control signal is sent.

The control signal generator 67 receives inputs from the detector circuitry 62 and a predictor module 65 and access rules 67a. Control signals may or may not be generated depending on outcomes of execution of the rules 67a by the control signal generator 67. Generally, data from the detector circuitry 62 and the predictor module 65 are inputs to the rules 67a. The predictor module 65 also receives inputs from the sensor interface 50, so as to receive sensor signals from one or more of the various sensors 28, and receives data from profile storage 52. The predictor module 65 also accesses stored detected historical patterns 66a that are or may be associated with stored profiles.

Building Profiles

Referring now to FIGS. 3A and 3B, modes of operation of the profile system 40 are shown. In FIG. 3A, a user produces 70 a profile for an entity, which profile includes personal information sufficient to enable the presence detection and prediction system 40 to detect the specific presence and a type of identity of an individual entity during operation of the presence detection and prediction system 40, as will be discussed below. Identity can be a legal identity, e.g., a user's given name or identity can be a system defined identity, e.g., a system generated tracking number or label.

A user inputs into the profiling system 42 a request 72 to produce a profile. The profiling system 42 receives the request to generate a profile and presents 74 an interface, e.g., renders a graphical user interface (GUI), not shown on a display or otherwise has an interface, e.g., a keypad and simple display that are menu-driven to allow the user to input information for the profile. The profiling system 42 opens 76 a new profile record and receives 78 data from the user. The profiling system 42 stores 80 the user populated profile record in profile storage (52, FIG. 2) and/or sends 82 via the network the profile record to the remote database (49, FIG. 2) accordance with privacy indicators.

Profiles can be established for residents of the structure, frequent visitors, pets, and even certain people identified as individuals, whom should not be on the premises and whose presence may for example trigger an alarm, even when the security system 12 is otherwise not armed. Each profile can be so indicated.

The information that becomes part of the profile record includes some or all personal information such as name, age, weight, gender, height, eye color, hair color, etc., as well as type of entity, e.g., resident, frequent visitor, pet, etc. In some implementations, the personal information that is input is accompanied by a privacy indicator that determines whether that piece of information is shared with other systems, e.g., whether it leaves the local profile store. In general, the profiling system 42 may store many different profiles on many different persons, especially family members and frequent visitors in a residential setting or employees in a work setting.

In FIG. 3B, generation of a profile record is system-initiated. The profile system 42 receives 91 a request to produce a profile for an entity, which profile will include personal information sensed by the presence detection and prediction system 40 for a specific unidentified individual entity collected during operation of the presence detection and prediction system 40, as discussed below. In this instance, identity is a system defined identity, e.g., a system generated tracking number or label. The profiling system 42 receives 91 the request and receives data 92 from the presence detection and prediction system 40. The profiling system 42 opens and populates 94 a new profile record and provides in the new record a system generated identity 96, e.g., tracking number or label. The profiling system 42 stores 97 the system generated profile record in profile storage (52, FIG. 2) and/or sends 98 via the network the system generated profile record to the remote database (49, FIG. 2) in accordance with the privacy indicators 81.

Sensor Signals

Conventionally, video cameras and microphone technologies are well suited for detecting presence. Video cameras and microphones have been used for presence detection. Video cameras and microphones produce video data and audio data that are processed using recognition processing and analytics. While excellent for presence detection and recognition, video and audio technologies generally can present major privacy concerns for many users. Moreover, video cameras are relatively expensive compared with sensor types discussed below.

Electronic devices generally emit r.f. during operation, and some of these devices generally produce different r.f. signatures. When a person turns on a television the action of turning on the television can produce r.f. energy that is emitted and which can be detected by an r.f. sensor. Such an r.f. emission can be used to detect presence. Similarly, other r.f. devices such as computers, cellphones, and the like produce/emit r.f. energy, especially when those devices are wirelessly connected to a network. These devices generally have a unique r.f. signature at least from connection information that involves an IP address in such r.f. devices attempting to connect to networks. Such a signature can be used to detect presence generally and specific presence in many instances.

Sound detection—Voice recognition can be used for detection. However voice recognition and especially speech recognition may pose privacy concerns. However voice signatures may pose fewer concerns and mere sound detection even fewer concerns, and can be used for presence detection. Sound signatures can be developed based on sounds people make during movements, e.g., a signature one makes walking up/down stairs or just by the sound of a person's footsteps. There could be other audio signatures from noise recognition to identify an activity that might allow the system to infer an action.

Temperature—Presence can be determined through detection of whether the temperature of room has changed (e.g., windows opening, wind of a body passing through it creating a draft, air movement, pressure), sun shining in a window because a shade is raised or a curtain is opened. Similar changes can be detected in humidity caused by a human entering the area.

Vibration—Vibration changes detected within a room can be used to indicate motion in the room and depending on the level of system analysis can also be used to identify violent struggles, such as could occur by kicking of a door vs. knocking on a door. Direction and movement information can be obtained with a sufficient number of vibration sensors.

Chemical/electrochemical—Chemical/electrochemical emissions/changes can be detected when a person is in a room, and in some instances unique emissions can be used to generate a signature to identify who the person (or animal, e.g., pet) is by processing sensor data and determining a biochemical signature that can be relatively unique for a person or animal. Such a unique biochemical signature can be used to identify someone new in a room or someone who came in the room in the past by retrieving a record of the biochemical signature recorded previously. VOC sensors can determine if there's smoke in the air, and organic compounds. There exists various types of VOC sensors, such as for marijuana detection as well as cigarette, cigar, detection, and certain type of shampoo, soap, etc. and are similar to the chemical signatures.

Contact—Contacts at entry and exit doors (and other places) can be used, to determine human presence as is commonly used in existing intrusion detection systems to detect presence. For example, if a door or window is opened, the system can infer that a human is present in the space.

GPS (global positioning system) transceivers. User devices such as, but not limited to, cell phones, generally have GPS transceivers that send/receive location data of the device (as well as device identifying information). The GPS messages can be used to detect movement, rate of movement and direction, especially outside of buildings.

Weight Sensors—Weight sensors, such as pressure or contact pads, can be installed in and under, furniture, carpeting, and flooring in the premises. Weight can be used to estimate the number of people in an area, whether people have fallen, (e.g., by using a distribution of pads and determine that the weight is distributed over a larger area). Weight can also be used with processing weight signals in combination with other sensors to provide an indication of specific individuals within an area.

Heat detection—Heat changes can be detected and used to estimate the size, direction, a number of people. Heat changes can be used to estimate, whether a person has just arrived from outside, e.g., person's signature is extremely hot or cold from being outside.

Optical or retina scanning detectors can also be employed with the presence detection and prediction system 40, to identify presence by specific individuals.

ECG Heartbeat Detection—ECG Heartbeats detectors can be used to detect heartbeats, e.g., in wearable computing and by using Doppler Effect processing such detected heartbeat signals can be processed to estimate motion towards or away from a another sensor by capturing small variations in the frequency of the heartbeats moving towards or away from a sensor that is picking up heartbeats form sensors on the wearable computing, e.g., from fitness bands that monitor ECG signals and transmits the ECG, signals to an, e.g., an r.f. sensor. The Doppler Effect is used to determine motion towards or away from a particular sensor by detecting small variations in the R.F. frequency of a carrier signal sent to the r.f. sensor from the ECG detectors. This will allow for determination of motion direction toward and away from any detector, and motion towards the left and right or up and down if several detectors are used.

Light detection—sensors can detect shadows moving across a room or detect whether a light has been turn-on (or off), determine if lights were left on while people are no longer in the room.

Devices coming online—person portable devices connecting voluntarily (authorized, known devices) or involuntarily (unauthorized, unknown devices). The presence detection and prediction system 40 may have detected a unique device (through device IP address) having approached the residence from the outside several times over an interval of time and now has detected that device inside the residence. Where the device is associated with a known person, this technique can be used for identification in addition to presence detection.

The above physical/chemical/optical characteristics can be captured using generally conventional sensors. In many installed intrusion detection (e.g., integrated security, intrusion, alarm systems) many of the above sensors are already deployed.

Using Presence Information Collected from Sensors for Movement Flow Records

Figure 4:
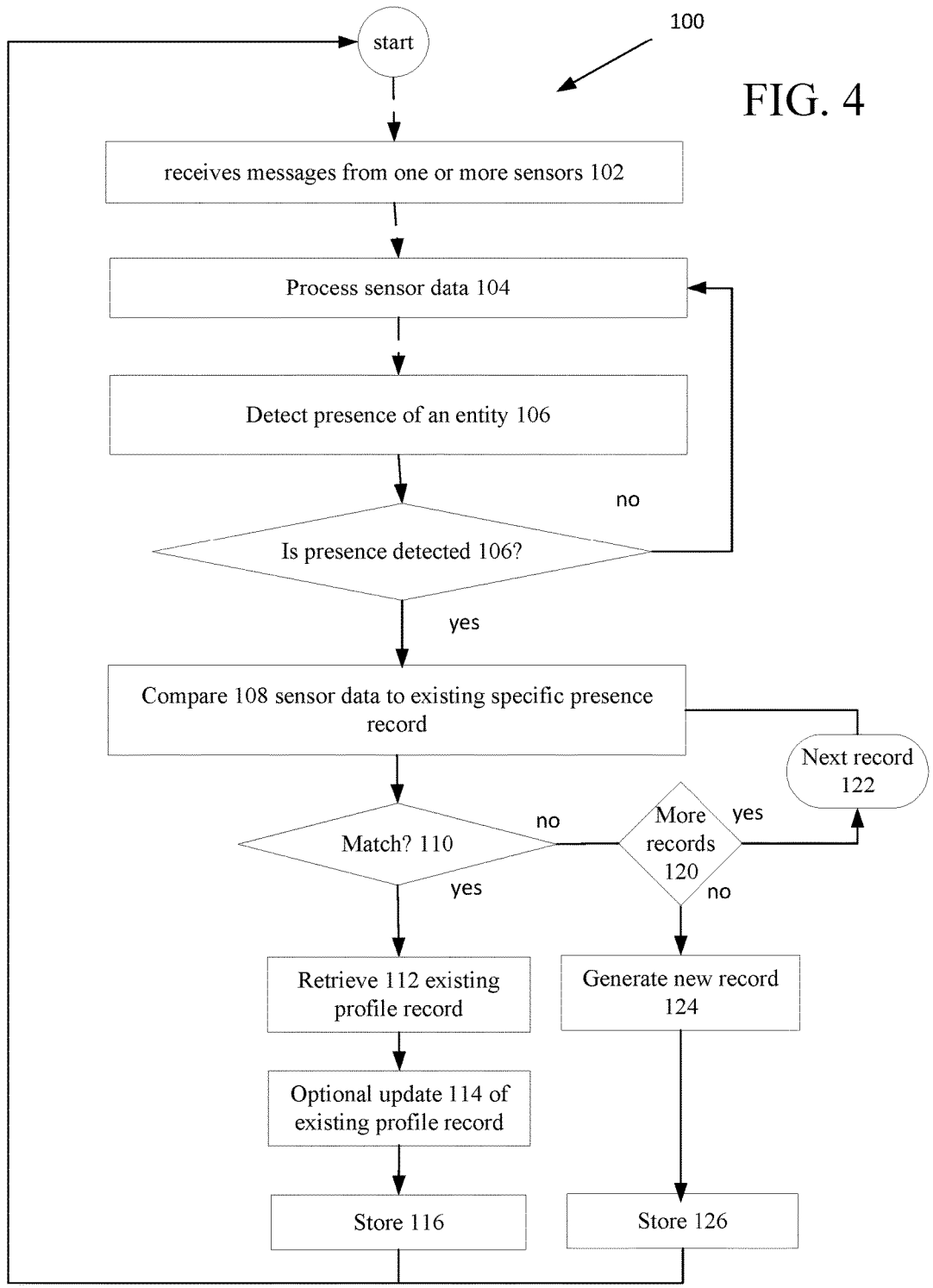
FIG. 4 is a flow chart of updating a profile using data generated by a detection system.

Referring now to FIG. 4, processing 100 for production of an updating of movement flow records executed in the presence detection and prediction system 40 (hereinafter also referred to as PDPS 40) is shown. The PDPS 40 is deployed either in the control panel 16 (or as a stand-alone system) and receives 102 sensor data from various sensors 28. The sensors 28 will generally be of several different types that detect any of the aforementioned physical/chemical/optical characteristics.

The PDPS 40 processes 104 the sensor data to detect the presence of an individual or entity in a location. One or more sensors send messages containing raw sensor data to the PDPS 40. In some embodiments, the PDPS 40 is in communication with the sensors via one or more (wired or wireless) data networks that are typically local networks. In other embodiments such as when the PDPS 40 is deployed in the panel 16, the PDPS 40 can receive sensor data from the panel 16. The PDPS 40 identifies 106 a presence of a moving object in a room, by detecting one or more physical changes in sensor data from one or more of the above sensors.

When a presence is not detected, the PDPS 40 continues processing 104 received sensor data, as such data is periodically received. When processing indicates a detection of a presence of an entity, the PDPS 40 compares 108 characteristics of the sensor data that was process to corresponding sensor data stored in retrieved movement flow records that are associated with stored profiles to detect a specific presence, i.e., to detect the presence of a specific entity. When a specific presence is detected, the PDPS 40 has found one or more movement flow records having sensor data that match 110 (or closely matches) sensor data characteristics of the presence that was detected. Details on matching are discussed below.

If a matching movement flow record was found, the PDPS 40 retrieves 112 the matching record (or records, if more than one record was found to match). The matching record may include a pointer to a stored profile record produced by the process discussed in FIG. 3A and the movement flow record will include or have references to historical pattern-detected records (discussed below). Optionally, the matching movement flow record may be updated 114 and stored 116. Updating of an existing record would generally be performed when a significant change in a value of the data (more than an empirically set threshold difference) or new sensor data were produced.

If a retrieved movement flow record does not match, the PDPS 40 checks 120 if there are more movement flow records to be examined, if so, retrieves 122 the next movement flow record and continues at compare 108. If there are no more movement flow records and no matching movement flow record (or records) were found, the process generates 124 a new movement flow record and generates a profile record using the process in FIG. 3B and stores 126 the new movement flow record. The new movement flow record may be updated at some point to include a pointer to a profile record whether produced by the process discussed in FIG. 3A or as discussed in FIG. 3B. The new movement flow record will include or have references to historical pattern-detected records (discussed below).

The process 100 uses the received sensor data to produce "movement flow records" that capture information regarding the detected specific entity's interaction with the premises as reflected by the sensor data. The movement flow record may be added to the profile if the movement flow record represents significantly new information pertaining to that entity, as discussed below.

If a specific presence is detected, but a matching record was not detected, the PDPS 40 generates the new profile record and the new "movement flow record." At some point personal profile information as discussed in FIG. 3A can be inputted into the profile record and overtime the movement flow records are updated and at some point may be associate with the updated profile. In many situations, the personal profile information may not ever be made available to the PDPS 40, in which case the PDPS 40 generates the profile record merely with a unique identifier, and stores the produced "movement flow record" with a pointer to associate it with the PDPS 40 generated profile record.

The PDPS 40 associates attributes of the detected entity with the generated profile record, such that the profile record can added to the PDPS 40 associated with the movement flow record and if additional movement flow records by the detected entity are subsequently produced by that detected entity further interacting with sensors in the premises these additional movement flow records can likewise be associated with the PDPS 40 generated profile record. The "movement flow record" is added to this profile if the "movement flow record" represents significantly new information pertaining to that detected entity, as discussed below.

The PDPS 40 is a 'learning system' where profiles are constantly updated, e.g., by adding references to movement flow records (and/or profile records) and are used to determine identification of entities, e.g., people, by combining data from numerous low cost/low power sensors that are not generally capable individually to determine identity, while at the same time avoiding use of sensors that can be privacy intrusive, such as cameras. The profiling processing can be done in some implementations on location, e.g., in the PDPS 40 installed as a standalone unit or as part of an intrusion detection system, as well as in the "cloud."

Sensors that are used include but not limited to motion, e.g., by motion detectors, radio frequency emissions, e.g., short distance, low energy communications, such as Bluetooth, Wi-Fi emissions (determine presences by observing bandwidth traffic on a local network) as well as video, LIDAR, audio, temperature changes, air movement changes and pressure changes.

With some embodiments chemical sensors can detect chemical emissions and produce chemical signatures. LIDAR, can be used to sense movement. The PDPS 40 can process one of more of these sensor signals to recognize shapes and figures, e.g., by LIDAR and/or video.

Depending on what parameters from what sensors the PDPS 40 is measuring will determine what processing is performed by the PDPS 40. Sensors of various types can be placed in many different types of devices and appliances commonly found in the home. One of the richest sources of detecting presences is from wireless routers or hot spots that receive radio frequency signals from personal devices that are within range and/or try to connect to the router and/or hot spot. The PDPS 40 can measure radio frequency emissions in an area and detect data, such as from a pico-cell, e.g., small cellular device typically covering a small area that is used to extend coverage to indoor areas where outdoor signals do not reach well.

The basic notion is that a combination of these sensors can identify specific people to various degrees of accuracy without necessarily using video/audio and facial/voice recognition. A weight sensor in a carpet could identify someone 200 lbs., for example. Temperature changes in a room and heat signatures of individual could be used to identify such persons as well as well as other objects.

Motion/movement is detected by motion detectors. Typically a motion detector can be placed in a room, the signals from conventional types of motion detectors can be used to detect presence in a room. In addition, several motion detectors whose signals are processed in unison can be used to detect motion towards a room, into a room, and from a room. These motion detectors can detect motion with a purpose, e.g., the rate and speed at which an object is moving, as well as direction. The PDPS 40 can study a person's motions in detail, and develop a signature of that person that can be used to recognize the person.

By combining some of these technologies, the PDPS 40 can detect presence and yet maintain a notion of privacy. In some embodiments, discussed below, data leaves the person's premises, however, if there is a full streaming audio of conversations (or video of movements) the person might not be so keen about sharing such data. The PDPS 40 uses a combination of lower-cost technologies (or in some instances higher cost but less intrusive technologies) and signals from these types of sensors on their own may not raise significant privacy concerns.

Another way to detect movement in a room is by sensing/measuring variations in r.f. signal strength in a room from signals captured by a r.f. receiver in the room. Signals emitted by r.f. devices, such as phones, computing devices, r.f. tags, etc. carried by persons may vary as persons enter/exit the room. Such variations of signals would be detected and processed to determine location. The extent to which r.f. would be used is primarily based on the extent to which a person desired to be intentionally tracked. A person bringing an r.f. device(s) into a room will cause fluctuations in r.f. signal strength.

The PDPS 40 takes the received sensor data and processes the sensor data through processing algorithms to detect specific presence. Specific algorithms that accomplish detection of specific presence are discussed below. Based on whether there was a detected specific presence, the PDPS 40 may generate data that is added to one or more existing profiles or to a new profile(s).

The PDPS 40 can be configured to determine when a certain group/set/collection of people are together. The PDPS 40 tracks (and records) how much time an individual uses to perform a task, such as how much time a babysitter actually spends with the baby or children. The PDPS 40 identifies presence (or specific presence) of multiple people to provide records as evidence of foul play (proving someone else was in the room when something happened, or actually identifying the person that perform a specific act.)

Personal Profile Records

Figures 4A, 4B:
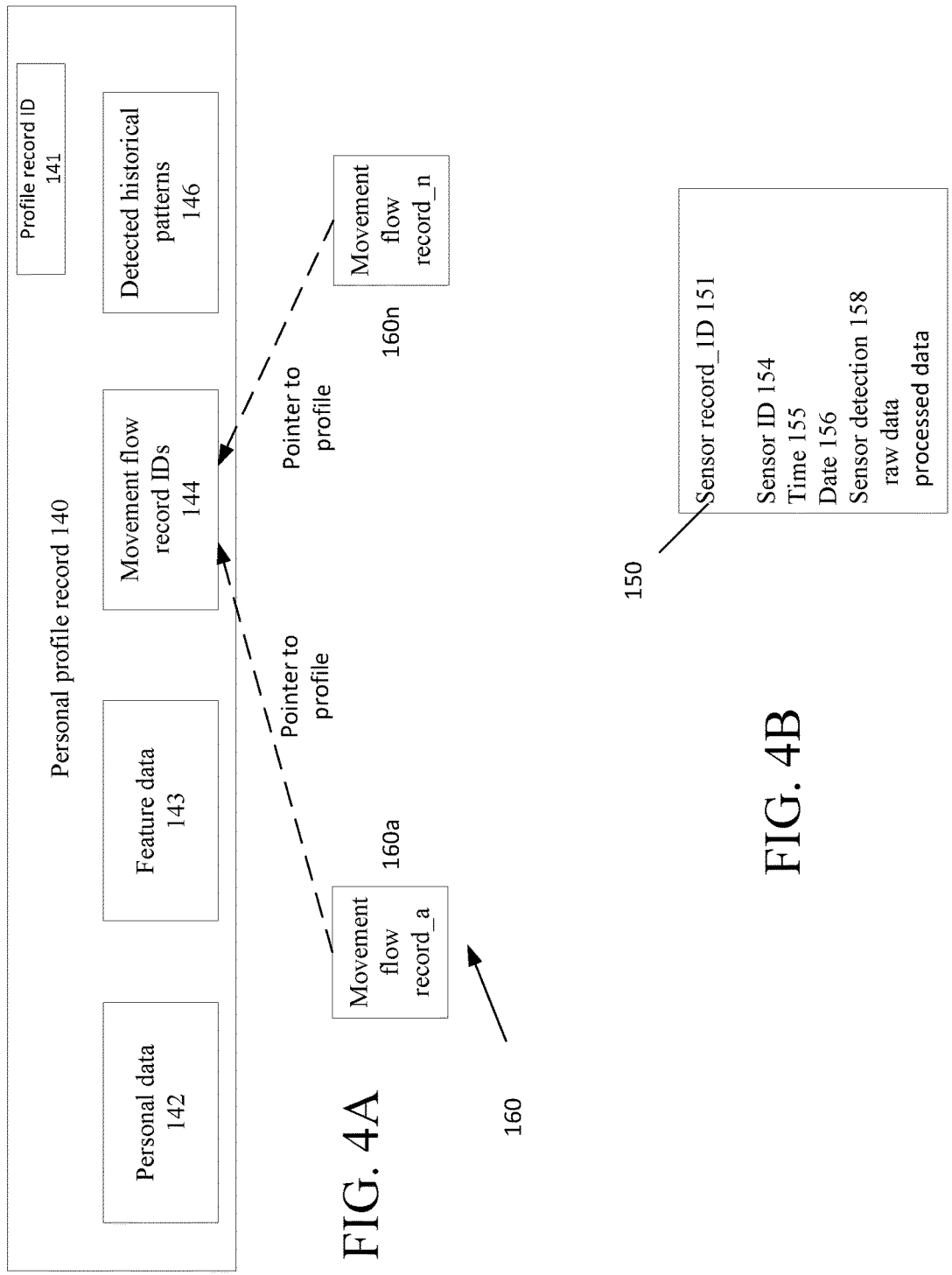
FIGS. 4A-D are block diagrams of various exemplary records.

Referring now to FIG. 4A, a diagrammatical view of a personal profile record 140 with associated movement flow records 160*a*-160*n* (generally 160 discussed in FIG. 4C) is shown. The depiction of a personal profile record 140 is exemplary. The personal profile record 140 includes a system generated profile record ID 141, store for personal identifying information 142 such as a person's name or a person's role in the premises, e.g., father, mother, etc. The personal profile record 140 also includes feature data store 143 that is captured by sensors and used to identify the person to the PDPS 40 (presence detection and prediction system 40), without any identifying action undertaken by the person. This feature data store 143 can store various information, such as feature data from facial recognition processing, that could be employed where cameras and appropriate hardware installed in the premises or the features can be obtained from other less expensive and less intrusive sensors, appropriately labeled, as discussed above. For example, weight detectors can be installed in the premises and other sensors as well as any of the sensors or combinations of sensors described above can be used. Another technique to detect specific presence is the presence of an electronic device with a specific IP address that is captured by a network hotspot. All of this data can be considered feature data that is captured in the store 143 of the personal profile record 140.

Each personal profile record 140 can be associated with one or more movement flow records 160 (FIG. 4C) through storage 144 of movement flow ID's. In addition, each personal profile record 140 will have associated detected historical patterns store 146 (discussed below).

Sensor Records

Referring now to FIG. 4B, a sensor record 150 is also shown. The depiction of a sensor record is exemplary. The format of such a record 150 will vary according the system and type of sensor. The sensor record 150 is a compilation of "raw" and/or processed sensor data from a specific sensor. Sensor records 150 can be continuously sent to the PDPS 40 that filters out duplicate sensor records 150 that contain no significant information or sensor records 150 can be sent when a particular sensor actually detects something of interest, e.g., a detected entity interacting with the particular sensor. Sensor records in some instances can be requested by the PDPS 40 sending one or more particular sensors messages to download sensor records to the PDPS 40.

As shown in FIG. 4B, a sensor record 150 includes a sensor record ID 151 and information such as a sensor ID 154 that identifies the sensor that captured the data, the time 155 and date of the sensor record 156, and a sensor message 158, e.g., raw data generated by the sensor and/or processed data from the sensor, if the sensor has such processing capability. Other information may be captured such as IP address of the sensor, etc.

Movement Flow Records

Figure 4C:
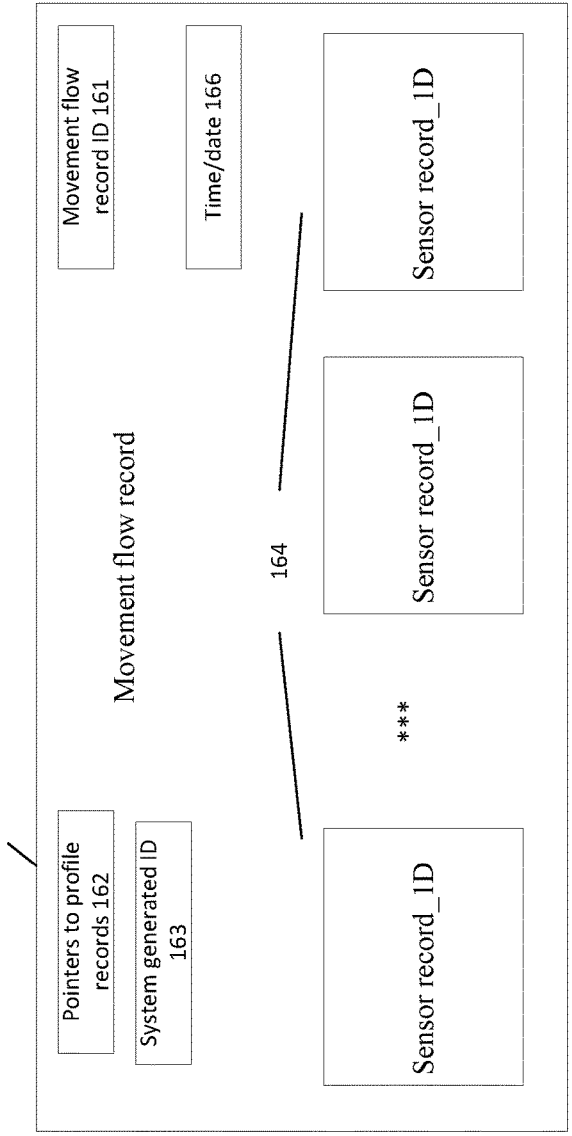

Referring now to FIG. 4C, a movement flow record 160 is shown. The movement flow record 160 is a structure that records a flow of a detected entity (or in the more complicated cases detected entities) interacting with a series of sensors over a period of time. The PDPS 40 produces a movement flow record 160 upon the PDPS 40 receiving a sensor message(s). The movement flow record 160 can include a movement flow record ID store 161, a structure 162 that stores one and likely several references to sensor records by sensor record ID, and in some implementations stores the references as an ordered list, ordered by time of when each sensor was encountered (or message received). The movement flow record 160 includes storage for information such as a store 164 of pointers to one or more sensor record ID's, a store 163 for a system generated, movement flow record ID and a store 166 for time and date.

For the relatively straightforward example of producing a movement flow record 160 for a single entity, the PDPS 40 simply filters as needed sensor records 150 (to eliminate duplicate records) and generates a representation (e.g., a directed graph, a graph, a structure, an ordered list) of sensor records ID's as received by the PDPS 40. If the PDPS 40 can determine a specific, identifiable entity likely corresponding to the received sensor records, the PDPS 40 includes that entity's profile ID in the movement flow record 160. Otherwise, the PDPS 40 populates the movement flow record with a system generated ID.

For a more complicated situation where there are multiple entities present in the premises and detected at the same time, the movement flow records that are produced may have sensor records that belong to several (i.e., more than one) entities. The PDPS 40 may filter these movement flow records to split these movement flow records into individual movement flow records for each detected entity. The raw data in the records can be analyzed to help split the records, as discussed below.

Historical Pattern Records

Figure 4D:
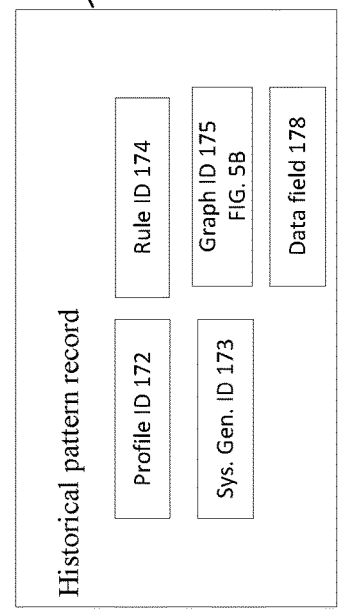

Referring now to FIG. 4D, from movement flow records 160 and profile records 140, historical pattern records 170 are produced. An exemplary format for a historical pattern record 170 is shown in FIG. 4D and includes the Profile ID store 172 and/or System Generated ID 173, each of which links or associates the historical pattern record 170 to a specific individual (or in the case of System Generated ID to the profile that matches the System Generated ID). Alternatively, the historical pattern record could include some or all of the data from the respective profile records, as the historical pattern record can take many forms.

The historical pattern record 170 also includes the detected pattern, which in this case is a Graph ID field 175 that points to a graph structure, and can include a Data Field that indicates when (e. g. time/days of the week, seasons, etc.) the historical record is relevant. The historical pattern record 170 is produced by the PDPS 40 to provide a record of a detected activity pattern for a specific entity (e.g., person). The historical pattern record 170 is determined by the PDPS 40 by analyzing the specific person's interactions with the premises, as captured by a series of sensors within the premises. Various techniques could be used to build the historical pattern record, from results obtained from machine learning (pattern recognition) techniques discussed below.

In one technique, the PDPS 40 produces the historical pattern record from movement flow records according to a rule. Thus, the historical pattern record in addition to the Profile ID and Graph ID will include a Rule ID store 174 (the rule from which that historical pattern record was processed). Data can also be stored in the historical record patter 170 in data field 178. The data can be various such as indicators when the pattern is valid, e.g., days, times, etc. with optional or supplementary data. As the historical pattern record will reference one and likely several sensor IDs one way to represent the historical pattern record is a graph structure. The nodes that represent the sensor ID's are associated with other information such as time and date of when the sensor was encountered and the sensor ID. A graph is a data structure that includes a set of nodes (vertices) and a set of connecting lines (edges) that establish relationships (connections) between the nodes. In the case of the historical pattern record the connections are generally unidirectional temporal indicators of the order in which sensors are encountered in the pattern. A graph G may be defined as follows: G=(V,E), where V is a finite, non-empty set of vertices and E is a set of edges (links between pairs of vertices). When the edges in a graph have no direction, the graph is called undirected, otherwise it is called directed. In general, information is associated with each node and edge of the graph.

Using Information from Sensors to Produce Historical Pattern Records

Figure 5A:
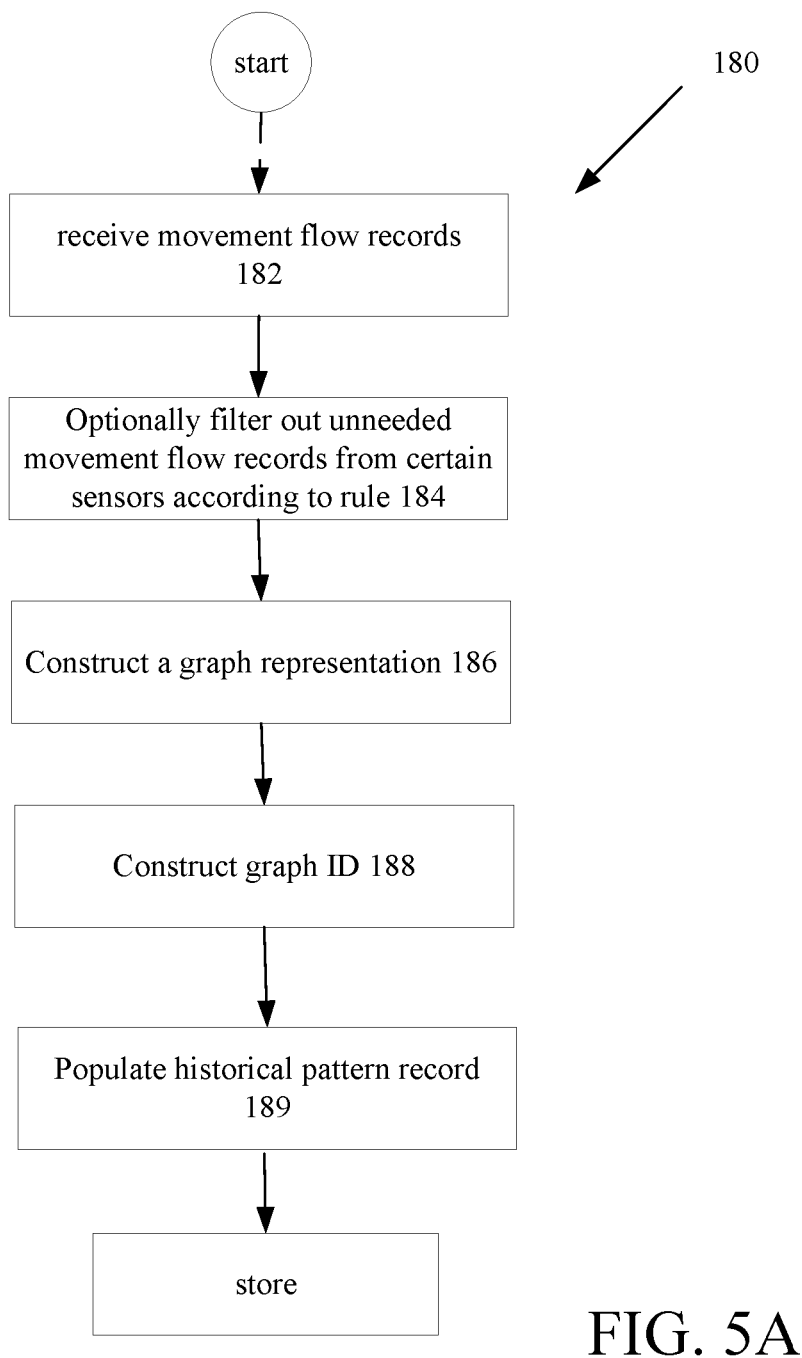
FIGS. 5A, 5C and 5D are flow charts of processes executed on a presence detection and prediction system.

Referring now to FIG. 5A, the following describes a process 180 for producing an historical pattern record 170 that is represented by a graph construct. In this example, a pattern is produced as the result of execution of a historical pattern rule that forms, e.g., a path, between a starting point and an ending point of the rule of the objects (sensors) encountered in between the starting and ending points.

A series of movement flow records is received 182 from various sensors. These records optionally can be filtered 184, meaning for a particular rule only certain records received from selected sensors are used for the particular rule. The process 180 constructs 186 a graph that represents the order and relationship of sensors that were encountered by the person. In the historical pattern, each sensor encountered is represented as a node or vertex of the constructed graph, and each relationship between two nodes is represented as an edge or link between the nodes. As such, in this example, the historical pattern is represented as a directed graph that is ordered and can be searched, with a constructed graph ID 188. The historical pattern record is populated 189 with data sufficient to associate the historical pattern record 170 to a profile record 140. Thus, the process 180 populates the historical pattern record 170 to include a value of an identified profile, if determined, in the profile ID 172, populate the Rule ID field 174 and add any optional or supplementary data to the data field 178. The historical pattern record 170 is also populated with the reference to the Graph ID 175 of the determined graph structure that stores 190 in this embodiment the determined historical pattern.

Figure 5B:
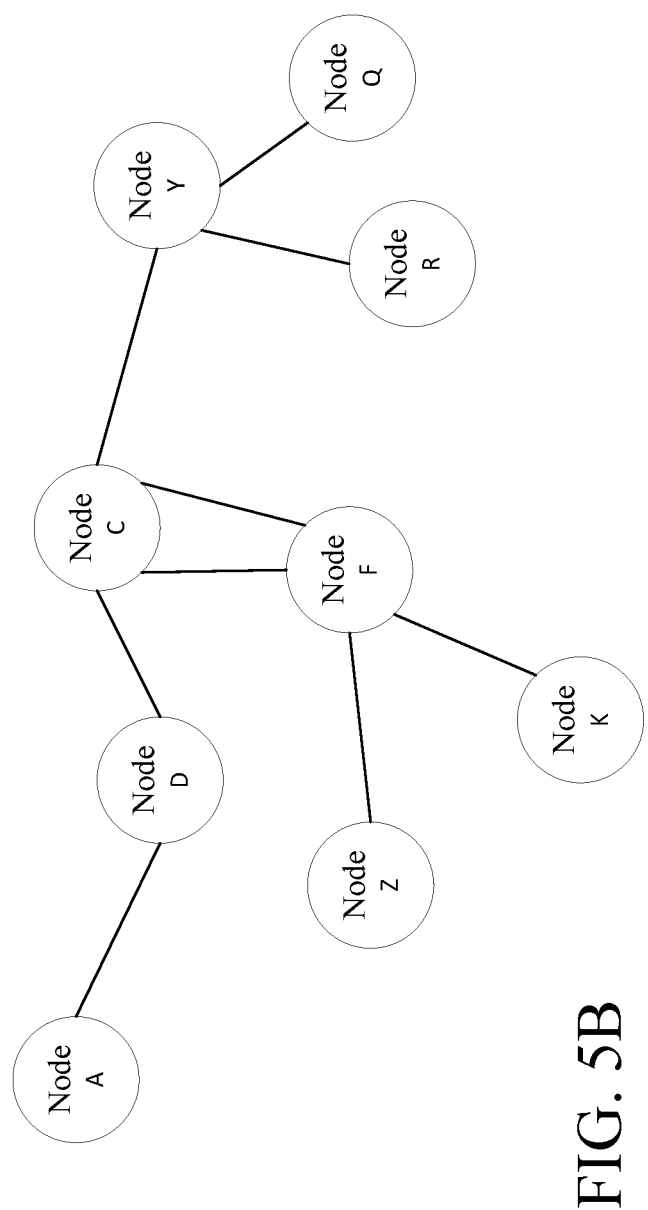
FIG. 5B is a graph structure.

Referring now to FIG. 5B, an exemplary graph structure is shown. This graph structure will be used in the example discussed in FIG. 5C. The graph structure represents an historical pattern produced for an individual. The graph structure in this example is composed of nine nodes that represent sensor ID's A, D, C, F, Z, K, Y, R, and Q. These sensor ID's have no special meaning but this unordered listing is used to illustrate that sensors can be encountered in any order. The nodes of the graph represent the sensors and are connected by edges that contain information regarding the relationship between the connected nodes.

From the movement flow records, the PDPS 40 constructs the graph from the sensors that are encountered in the pattern. Each sensor is assigned to a single node on the graph. The nodes of the graph are connected with edges that in this example correspond to relationships between the sensors as encountered by the person. Each edge contains information about connectedness, that is, the relationship between connected nodes. This information can take various forms. For example, one such description in one graph could be the time or day and/or season that a particular node is connected to a different node. The description could include other information, as appropriate between one node and the connected node. Since each node generally has one or more edges that connect to one or more other nodes, a description of the relationship between nodes, can be obtained by accessing the construct represented in a data structure that stores the information defining the relationships among nodes.

Figure 5C:
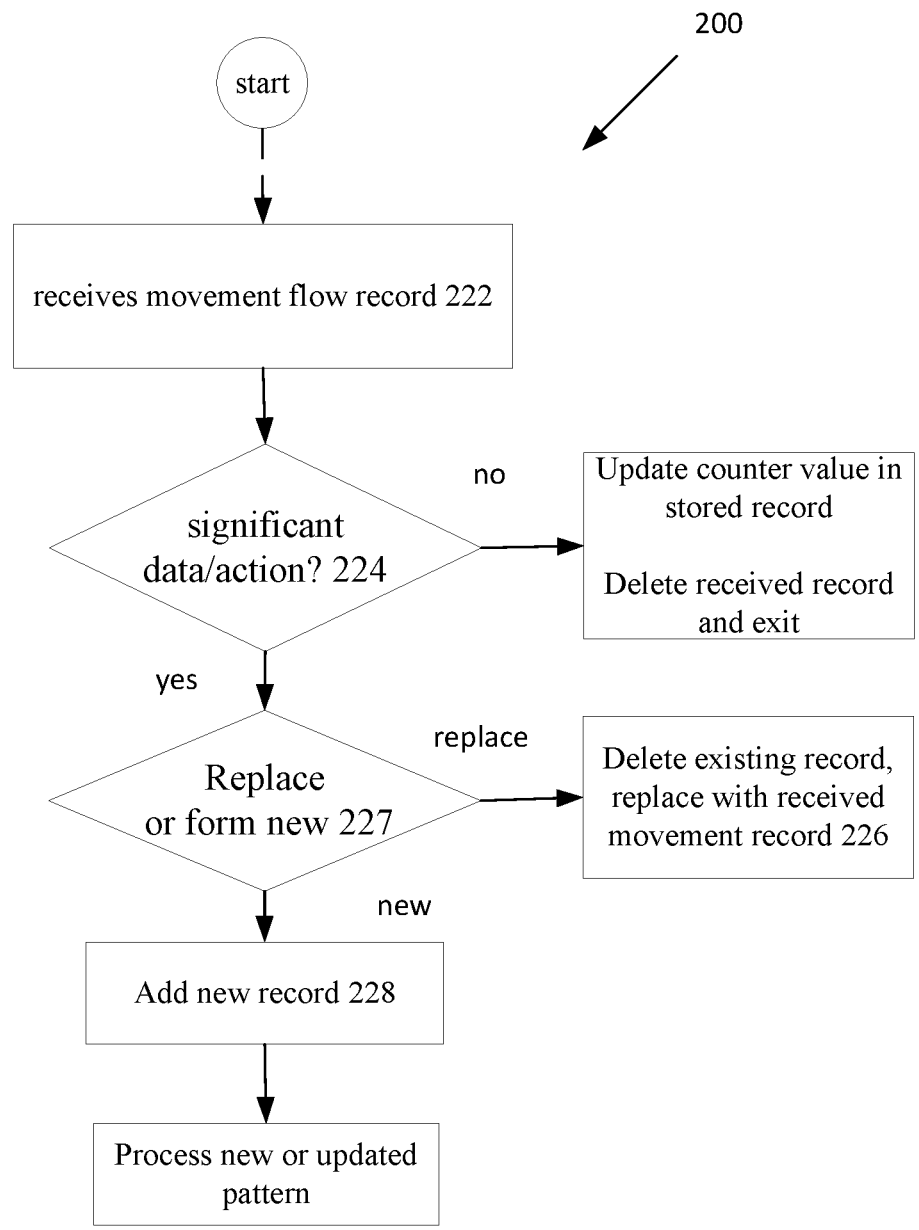

Referring now to FIG. 5C, processing 200 of movement flow records 160 is shown. The PDPS 40 (presence detection and prediction system 40) collects movement flow records overtime. Generally, the PDPS 40 can keep a fixed number of days' worth of records, e.g., 7 days, 14 days, a month etc. or a fixed number of records. In some embodiments, the PDPS 40 can keep a very large number of movement flow records, but in general, the PDPS 40 continually updates the movement flow records by producing new movement flow records and associated these new records with a corresponding profile and deleting outdated movement flow records.

In general, the PDPS 40 receives 222 a movement flow record, determines 224 whether the movement flow record includes significant information regarding a significant action. To determine whether a movement flow record includes a new significant action, the received movement flow record is compared to stored movement flow records from that Profile ID (or system generated ID). The values in the stored record (e.g., at least the series of sensors encountered) are compared to corresponding values in the new record. If the received record and stored record differ by an empirically defined amount 227, the movement flow record is either used to replace 226 an existing movement flow record or is stored as a new movement flow record 228.

For example, if the new movement flow record for a specific profile for a different day of a week as a stored movement flow record has the entity corresponding to that profile ID interacting with the same sensors in the stored movement flow record, but on different days of the week, the PDPS 40 can determine that the new record includes a new significant action and stores the new movement flow record.

However, if the new movement flow record for the specific profile for the same day of a week as a stored movement flow record has the entity corresponding to that profile ID interacting with the same sensors in the stored movement flow record, the new record can be discarded, but a count can be kept (e.g., in the record) indicating that the same movement flow was again encountered on that day 223. Otherwise, the PDPS 40 determines if it should replace an existing movement flow record as the current one has updated data but no new actions, and if so, deletes the existing record 226, and if not adds 228 the new movement flow record to storage and processes 229 that record with other records to either generate or update an historical profile.

Example of Producing Historical Pattern Records

Figure 5D:
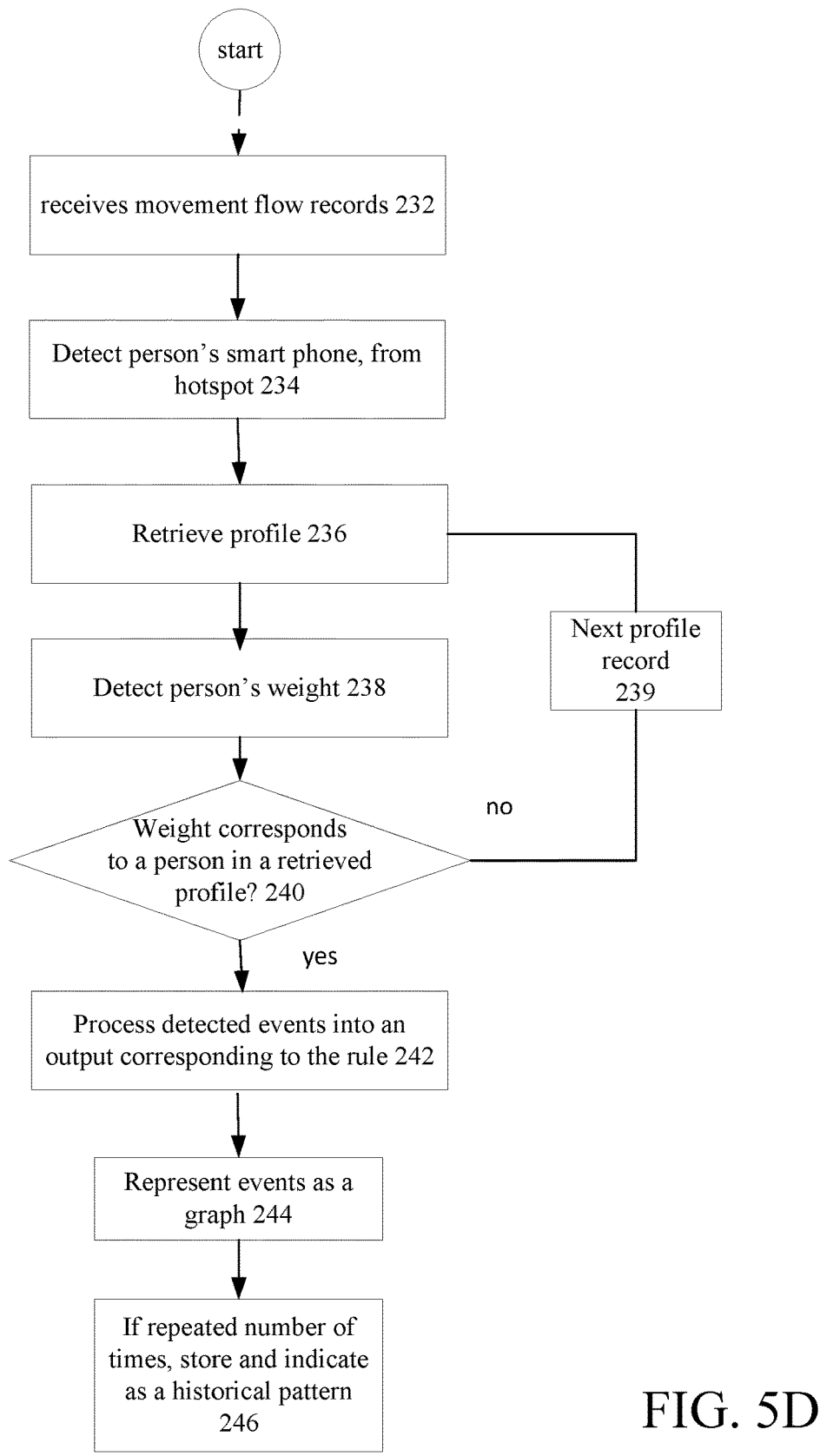

Referring now to FIG. 5D, in this example 230 the PDPS 40 seeks to learn a pattern of what persons do when they first come home during the work-week from previously produced and stored movement flow records. The PDPS 40 process these previously produced movement flow records according to various pre-defined or user defined rules.

The rules can be organized in a hierarchy that involves an upper level rule that invokes lower level rules.

An example of an upper level rule is:

<routine of person <X> coming home in the evening>.

This upper level rule can be predefined on the PDPS 40. Upper level rules can be rules that are used to establish a specific pattern such as the rule above. Lower level rules can be associated with various sensors (either individually sensor records or groups of sensors movement flow records). Lower level rules are invoked according to the specific upper level rule. Thus, for the above upper level rule, the following exemplary rules could be used to determine this pattern from sensor records stored by the system.

Assume that the premises is occupied by several persons A, B and C. The activities of each of these persons can be processed by the routine of person <X> rule where "X" seeks to learn an activity pattern for entities A, B or C from, e.g., two different sensors, a weight pad at each door and an r.f. detector at each door. In this example, the premises has two entry points (doors) from the outside, with weight pads at each entry point. In this example, there are motion detectors in several rooms and a near-field r.f. detector at or near each door.

Many sensor records and movement flow records from sensors in the premises are accumulated over various times. The process receives movement flow records, which initially are assumed, as having no specific identifying data.

To process the upper level rule, the PDPS 40:

<retrieves movement flow records that include detected cell phone at the front door>

<retrieves movement flow records that include a detected cell phone at the side door>

<retrieves movement flow records that include a weight measure at a weight pad at front door>

<retrieves movement flow records that include a weight measure at a weight pad at side door>

<produces intersections of movement flow records according to common detected cell phone and common detected weight at common doors>

<groups of intersecting movement flow records may correspond to A, B, C>

<assigns A, B and C to grouped movement flow records>

In a subsequent pass, the process executing on the PDPS 40 learns what each of A, B, C does after entering the premises. For example, focusing on person "A," the PDPS 40:

<filter movement flow records to retain only records that have A's weight +/_% deviation>

<for given day sort movement flow records of A's weight in a chronological encountered order>

<stores sorted movement flow records of A's weight for the given day as a pattern for the given day>

Thus, initially the PDPS 40 detected a person "A" was approaching the front door of the house by the person's client device, e.g., a smart phone being detected by a hotspot. The PDPS 40 next detected that the person entered the front door and receives a weight measure from the pad sensor. These two sensors can be used to filter out other movement flow records that do not have this weight and cell phone combination and remaining records are sorted to construct a chronology of activity for A on a given day for a given time period. The chronology is determined according to the day/date/time data in the movement flow records.

At any point, this pattern for A with sufficient identifying information can be associated with a profile for A that specifically identifies A from the profile database. The PDPS 40 retrieves that person's profile, if any, from storage and retrieves that person's personal data.

Thus, referring now explicitly to FIG. 5C, subsequently the PDPS 40 determines from received 232 movement flows records when person "A" (whether associated with a specific profile or a system generated profile) enters the house through the front door 234, the process retrieves profiles 236, and when the person steps on a rug under which is a mat that has a weight sensor. The weight sensor sends a message to the PDPS 40 to inform the PDPS 40 that an object of x lbs. was detected 238.

If the PDPS 40 confirms that the detected weight roughly corresponds to the weight of person A, the PDPS 40 can assume that the object detected is person A and processes detected events into an output corresponding to the rule 242. Otherwise it processes another profile record 239.

As a more concrete example, assume that person A's initial routine the first time the PDPS 40 processes this rule, detects the following pattern of behavior.

A's cellphone is detected on Monday, a workday at 6:05 PM.

A person entered via the front door triggering the weight sensor pad.

A person traveled via a hallway to the kitchen a short time after.

In the kitchen, a person turned on the kitchen light a short time after.

A person in the kitchen, 2 minutes later opened the refrigerator.

A person then walked from the kitchen back through the hallway to the living room.

A person closed the drapes in the living room.

A person turned on a Bluetooth controlled audio device.

In the living room A person remained for an extended period of time.

The PDPS 40 processes 242 these series of events as the <routine of person <X> coming home in the evening>, as mentioned above. Thus in operation, the PDPS 40 constructs 244 a graph that represents the detected pattern corresponding to person A's historical pattern when person A comes home. The PDPS 40 detects 246 this historical pattern as a generally regular occurring pattern that occurs on a regular basis each workday around that time of day, and thus saves this as a detected pattern in or associated with person A's personal profile (FIG. 4B) using the cell phone detection and weight as delineating "A" as the person detected.

The graph constructed is diagrammatically depicted in FIG. 5B and shows a node A representing sensor A (a near field r.f. detector) as the starting point of the person approaching the house. Node A has an edge connected to node D representing the weight sensor at the front door. The graph shows that node D is connected via an edge to a node C representing a motion sensor in the hallway. Node C is connected via an edge to node F representing another sensor F in the kitchen. In the kitchen, the kitchen light node Z (sensor Z) has an edge connecting to Node F and the refrigerator contact, Node K (sensor K) has an edge connecting to Node F. This person's travel from the kitchen back to the hallway is captured by the second edge between Node F and Node C. Person A traveled from the hallway Node C to the living room Node Y (where a motion sensor detected travel). There are also edges connecting Node Y to Node Q and Node R, representing the closing of the drapes Node Q and turning on of a Bluetooth controlled audio device sensor Node R. As the person remained in the living room for an extended period of time, the PDPS 40 can treat this as an endpoint for this processed rule.

Similar processing occurs for B. However, the processing need not be identical. For instance in this example, B has a weight that differs from the weight associated with A and B does not have a client device that can be detected and generally enters through the side door.

An example of processing the above upper level rule <routine of person <X> coming home in the evening> for B is as follows:

<retrieve movement flow records that include detected cell phone at the front door>
<retrieve movement flow records that include a detected cell phone at the side door>
<retrieve movement flow records that include a weight measure at a weight pad at front door>
<retrieve movement flow records that include a weight measure at a weight pad at side door>
<sort movement flow records according to common detect a cell phone and common weight at common doors>

The PDPS 40 can vary processing according to how much profile information is present for an entity. If for example, the PDPS 40 has a profile on B and by accessing that profile determines that B does not have a cell phone, then the PDPS 40 can skip the rules that detect a cell phone, and apply the lower level rules that retrieve movement flow records with weight measures at the front and side doors and sort the records looking for B's weight or common weight.

<sort movement flow records according to weight at front door>
<sort movement flow records according to weight at side door>

The PDPS 40 can try to use another sensor signal to identify B. For example, any one or more of the sensor types mentioned above, which provide unique sensor signals that can be correlated to a specific individual could be used with the weight sensor. Examples include LIDAR, (of course audio and video), temperature and chemical sensors, heartbeat, retina scans, etc. Similar processing would be performed by the PDPS 40 using one or more of these other sensors in order to improve detection of B. Additional sensors of course could also be used to identify A.

In any event, in subsequent passes, the process executing on the PDPS 40 learns what B does after entering the premises, in a similar manner as done for person "A," by the PDPS 40, as described above.

This processing is iterative and continually refines characteristics and patterns for each of the entities A, B and C and constructs refined versions of the graph to represent detected patterns corresponding to person B's historical pattern when the person B comes home.

Similar processing occurs for C. Again, the processing need not be identical to that of A and B.

When A and B or A and C, etc. enter the premises concurrently, individual sensor signals will be produced as a result of each entity interacting with the sensor. Thus, for A the PDPS 40 will most likely be able to detect unique weight signals (especially if they enter separate doors) or if they enter from the same door will detect separate signals unless they step on the pad at the same time. The PDPS 40 can thus track each of these individuals based on the processing above.

In some instances, especially as the number of persons in an area grows to a large number the PDPS 40 will likely produce movement flow records that have combined information from several individuals and these records may not be useful and ultimately will be cleared from the system.

In order to execute graph-based processes in a computer several representations of a graph may be used. Examples of such representations include Object oriented representations where there is a structure for each vertex (representing whatever information is to be stored), and another structure for each edge (with pointers to the two vertices to which it connects). The object oriented representation may include a list or array of structures for each of these objects. Another representation is an adjacency list representation, where each vertex keeps a linked list of the neighboring vertices. The edges are typically not included. This representation makes it easier to find edges connected to any particular vertex. Another representation is an incidence list that combines the adjacency list and the object oriented representation. To obtain an incidence list, one adds to the object oriented representation, a list, for each vertex, of pointers to the edges incident to the vertex. Others such as adjacency matrix and incidence matrix could be used. The type of rules can influence which type of representation is best to use.

Generalized Rule Process for Producing Historical Pattern Records

Figure 6:
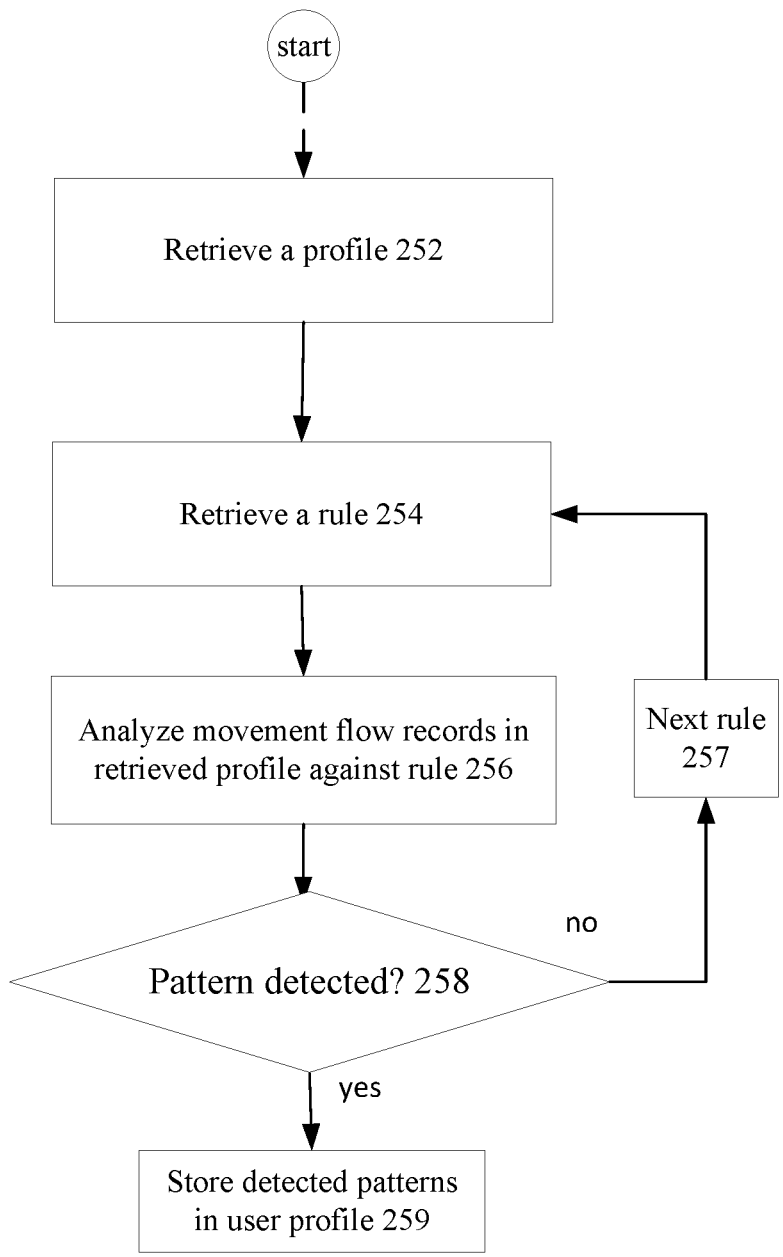
FIG. 6 is a flow chart depicting historical pattern discovery.

Referring now to FIG. 6, the PDPS 40 uses the personal profiles to detect historical patterns 250. In general, for a personal profile, the PDPS 40 retrieves a personal profile 252, and retrieves associated movement flow records for that profile. The PDPS 40 has a set of rules that are used to detect historical patterns, for example the rule mentioned above. In general, the PDPS 40 retrieves a rule 254 and retrieves relevant movement flow records and processes 256 the relevant retrieved movement flow records against the retrieved rule. Each rule will by necessity involve certain sensors. For example, the upper level rule above involves sensors that are encountered when A first comes home from work, which may be different from sensors encountered when A awakes up on a weekend in the spring. For each rule evaluated, the process 250 determines 258 if a pattern was detected. The PDPS 40 stores 259 the detected pattern as an historical pattern. If for a retrieved rule the system does not detect any pattern, the system retrieves 257 another rule and repeats the process until the movement flow records have been processed through all defined rules.

Methodology

When the profiling system 42 receives a profile, the system, e.g., PDPS 40 stores the profile in a persistent database, e.g., either 52 or 49 (FIG. 1). In the profile are personal characteristics and daily routine(s). The profile takes into account sensor data from the sensors. A sensor produces sensor data that indicates an event when the sensor detects a sensor condition. A cache memory can be used in the profiling system 42 or if the device cannot handle it, the cache can be in the cloud, is used with data aggregated from multiple sensors, e.g., sensor records. A section of the database keeps track of sensor data, e.g., sensor records, from the sensors and manages that data, e.g., sensor records. A higher level process determines from the, e.g., sensor records whether the data is associated with a particular profile and is worthy of permanent storage as part of that profile or as part of determining historical information.

Once that determination is made, the profile and/or historical pattern information is updated, as appropriate, the updated profile and/or historical pattern information is committed to permanent storage, e.g., in the remote and/or local database. The cache is cleaned out of the collected events. This is an ongoing process, as the system collects events and builds up the person's profile and historical pattern information, e.g., the person's routine. A process examines the historical pattern information to determine a correlation with a routine conducted in a prior day or that day in a prior week or a prior month or season, etc. Some analysis may be done in the sensors and that data from the sensors may be passed on to processing that is performed locally or in the cloud for the analytics for tracking events and correlate those events over time to determine specific patterns.

Thus the PDPS develops a baseline of the physical characteristics and routines for a person. Overtime however, that baseline will be constantly changing. The system determines anomalies, a person coming or going and as each is detected two things happen, the system determines whether that anomaly requires a response, (most of the time, no) and does the anomaly require the system to reset the determined baseline for that person. Thus, historical patterns are determined by application of specific historical pattern rules, using supervised pattern recognition techniques that operate on the movement flow records and profile records or even at a lower level by using sensor records and profile records.

Historical patterns need not be determined by application of specific historical pattern rules, as discussed above. Rather, patterns can be discovered using unsupervised pattern recognition techniques that operate on the movement flow records and profile records or even at a lower level by using sensor records and profile records. The pattern recognition techniques can be applied to discover predictable reoccurring patterns in sensor records and profile records or movement flow records and profile records. Thus, in the example above, rather than a rule being retrieved and actions processed according to the rule by the PDPS 40 to determine what sensors were encountered by the person to satisfy the rule, the PDPS 40s executes, e.g., unsupervised pattern matching algorithms to process many instances of that person's actions in the house (movement flow records) at that time to construct a graph that represents a pattern of behavior. The graph can be labeled and stored.

Many types of learning algorithms could be used. A clustering analysis can be applied to the data to reduce the data, e.g., to merge movement flow records and sensor records for instance. Pattern recognition processes that use labeled 'training" data are generally considered supervised learning techniques whereas unsupervised learning techniques generally do not have available labeled training data but are used to uncover hidden or unknown patterns.

Described was a simplified example. In an actual system many of these steps could be done in a different order or left out or other activities could intervene. &&&

A Use-Case Scenario:

The PDPS 40 processes sensor data according to the above rule:

<routine of person <X> coming home in the evening>.

Figure 7:
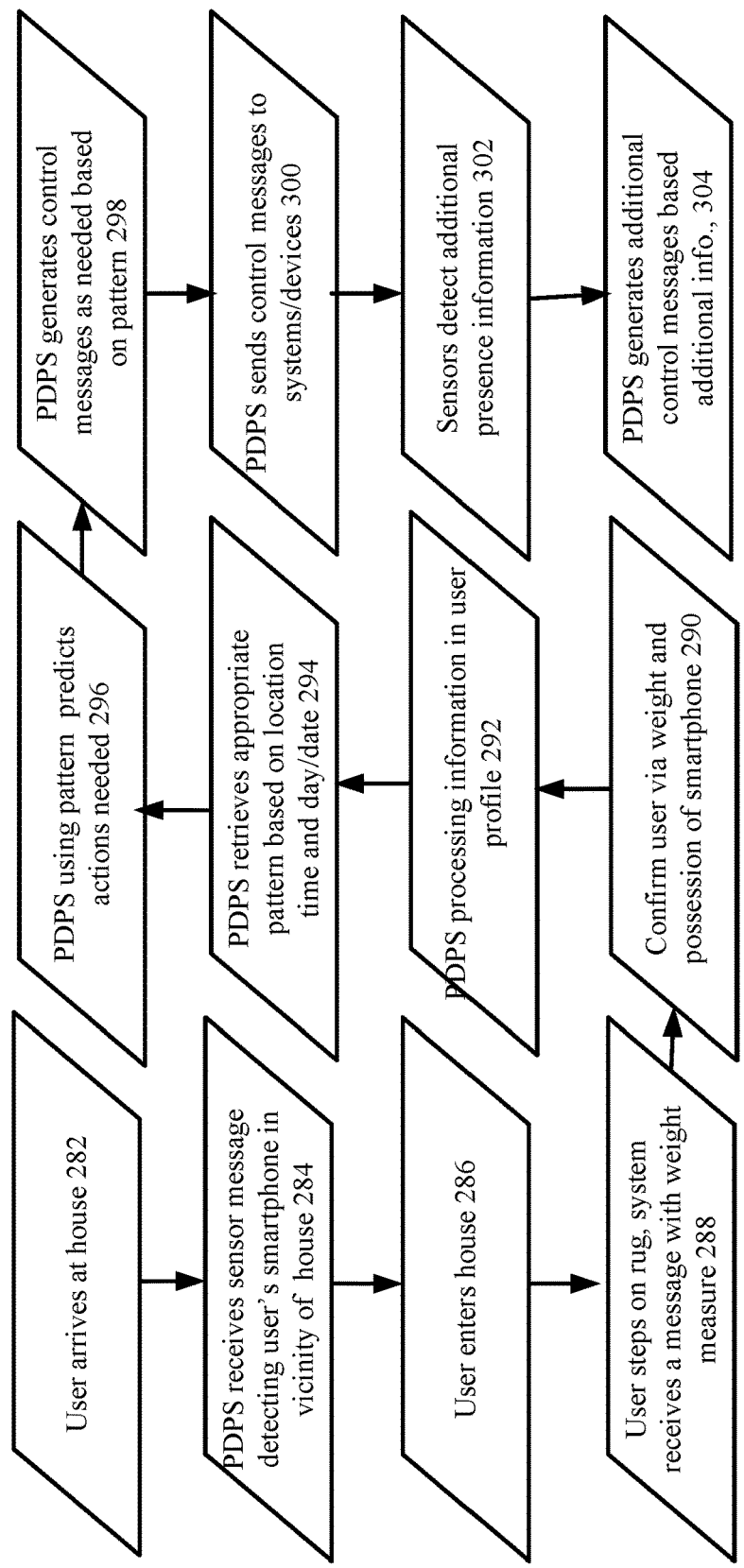
FIG. 7 is a flow chart depicting an example of historical pattern discovery.

Referring now to FIG. 7, an example of processing 280 by the PDPS 40 using the above rule is shown. The PDPS 40 seeks predict a routine of the person based on an historical pattern. In this instance, the PDPS 40 determines the time of day and day of the week and determines that it is a work-day at 5:50 in the evening. The system will thus reference the above rule and search its database to determine whether there are historical patterns for one or more entities, which are associated with the particular rule, of what persons in the premises do when they first come home during the work-week.

A user person approaches 282 the house. The PDPS 40 detects 284 that a person is approaching the front door of the house by the person's client device, e.g., a smartphone being detected by a hotspot near that door. The PDPS 40 retrieves 286 that person's profile, if any, from storage and retrieves that person's personal data. The person enters the house and steps on a rug under which is a mat that has a weigh sensor. The weight sensor sends a message that is received 288 by the PDPS 40, which message is that an object of x lbs. was detected. The PDPS 40 confirms 290 that the detected weight roughly corresponds to the weight of the person, (from the profile) and assumes that the object detected is the person. The PDPS 40 processes 292 that retrieved profile, if any, from storage or adds a new profile and retrieves that person's personal data. The PDPS 40 retrieves 294 an appropriate historical pattern based on location (front door), time of day and day of week. The PDPS 40 will produce predictions 296 of the person's behavior according to the retrieved historical pattern.

Previously in this example, the system detected a pattern of behavior in which this particular person on, e.g., each workday around 6 PM, enters via the front door, travels via the hallway to the kitchen. In the kitchen, the person turns on the kitchen light, stays a few minutes and then opens the refrigerator. The person then walks from the kitchen back through the hallway to the living room where the person closes the drapes and turns on a Bluetooth controlled audio device. In the living room person remains for an extended period of time.

The PDPS 40 having detected the presence of the person and based on the pattern retrieved, generates predictions of behavior. These predictions cause the PDPS 40 to generate messages 298 and send 300 these messages to appropriate systems in the house to control specific systems/devices in the house, in a manner determined by the historical patterns and the profile. The PDPS 40 receives additional sensor data 302 and generates 304 additional control messages based on the additional data, historical patterns and profile, as well as storing and updating as necessary movement flow records and historical pattern records.

Thus, as an example, the PDPS 40 retrieves the pattern and based on the pattern PDPS 40 predicts that the person will immediately walk into kitchen and turn on the light. The pattern PDPS 40 thus generates a signal that controls the lights to cause the lights to turn on. The PDPS 40 also predicts that a short time later that person will close the drapes in the hallway. The PDPS 40 receives signals from sensors in the kitchen and hallway. The PDPS 40 processes these signals and forms an indication that the person is likely headed towards the living room. The PDPS 40 generates and sends messages to close the drapes and control the Bluetooth controlled audio device.

Thus, in this mode of operation, the PDPS 40 processes the historical record to determine what devices/systems the PDPS 40 will control and generates and sends these messages in a temporal order based on the historical profile and current signals from sensors that detect the person is progressing though his routine. Thus, above when the PDPS 40 received the signals from the sensors in the kitchen and hall way the PDPS 40 processes these to form a decision that the person has exited the kitchen and likely is following the historical pattern, as the person is in the hallway and thus is headed towards the living room. A personal profile can be associated with many historical patterns, either according to specific rules or which are discovered through pattern recognition. Many settings in a house can be controlled such as in addition to controlling drapes and electronic devices, others include thermostat settings, appliances, doors, lighting, and so forth.

On the other hand if the there is no historical record in the profile that indicates what happens when the person leaves the kitchen, various sensors in the kitchen and living room will send signals to the PDPS 40 and the PDPS 40 will generate a new movement flow record that may be added to the profile.

Another rule could be what happens when the person exits the house. The person's presence has been removed, as detected by sensors, so various systems in the house can go to a state desired when the person is no longer present, such as doors lock, blinds close, lights are turn off, thermostat settings regulate to a lower temperature in winter, higher temperature in summer and a house alarm system is ARM'ed.

Detect and Recognize Persons Using Inexpensive Sensor Technologies

Figure 8:
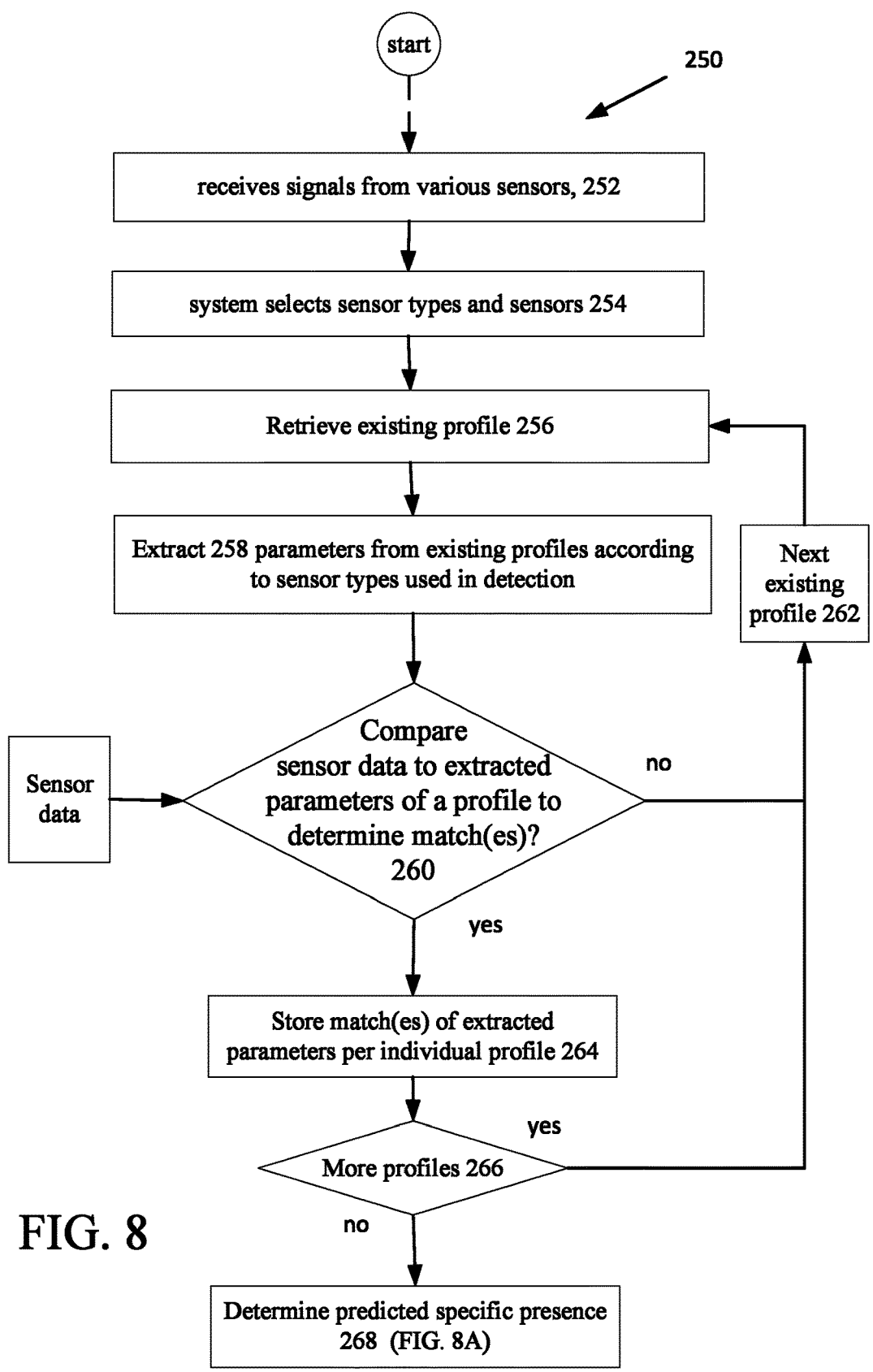
FIG. 8 is a flow chart of a process for detecting and recognizing persons using inexpensive, privacy aware sensor technologies.

Referring now to FIG. 8, in some implementations inexpensive and non-intrusive, e.g., privacy-aware, technologies can be used to detect and recognize presence of specific individuals. Conventionally, use of video and audio technologies with appropriate recognition software, e.g., facial and/or voice, can be used to recognized the presence of specific individuals. However, some persons may find such approaches extremely intrusive, i.e., non-privacy aware. In addition, in the context of residential intrusion and alarm systems, oftentimes video and audio technologies are not part of such systems, but have other sensor types. It would be nonetheless desirable to detect and recognize presence of specific individuals without using video and audio technologies.

In this context, the PDPS 40 has a presence detection mode 250. In this presence detection mode 250, signals from plural, different types of sensors are processed and used to recognize the presence of specific individual(s). In general, the PDPS is configured to examine signals from specific sensors (specified based on location and the type of sensor element). The types of sensors used exclude video cameras, and microphones with circuitry to detect and process speech. The types of sensors used include r.f. detectors that can detect r.f. energy emitted by devices during operation and especially those devices wirelessly connect to a network. These r.f. detectors can be network hotspots, routers, and the like that can capture an IP address from such r.f. devices attempting to connect to the network, detection of devise coming on line or interrogate a device for a device ID, etc.

Microphones can be used to detect sounds as well as voice signatures (may pose fewer concerns) and sound detection poses even fewer concerns, both of which can be used for presence detection. Temperature sensors can be used through detection of whether the temperature of room has changed. Similar changes can be detected by humidity detectors that measure changes in humidity caused by a human entering an area. Vibration detectors within a room can be used to indicate motion in the room. Chemical/electrochemical detectors can detect chemical/electrochemical emissions/changes. Unique emissions can be used to generate a signature to identify who the person (or animal, e.g., pet) is by processing chemical/electrochemical sensor data to determine a biochemical signature that may be relatively unique for a person or animal.

Contact sensors at entry and exit doors (and other places) can be used to infer human presence. User devices such as, but not limited to, cell phones, generally have GPS transceivers that send/receive location data of the device (as well as device identifying information). The GPS messages can be received by r.f. detectors and used to detect movement, rate of movement and direction, especially outside. Weight Sensors such as pressure or contact pads, can be installed in and under, furniture, carpeting, and flooring in the premises. Other sensors include optical or retina scanning detectors, ECG Heartbeat detectors that detect heartbeats in wearable computing devices and by using the Doppler Effect processing mentioned above, such detected heartbeat signals can be processed to estimate motion towards or away from given location. Other sensors that can be used are those that detect changes in light, e.g., sensors can detect shadows moving across a room or detect whether a light has been turn-on (or off), determine if lights were left on while people are no longer in the room.

The above physical/chemical/optical characteristics can be captured using generally conventional sensors. In many installed intrusion detection (e.g., integrated security, intrusion, alarm systems) many of the above sensors are already deployed.

Still referring to FIG. 8, the presence detection mode 250 receives 252 signals from various ones of these sensors (as well as other types) as described above. In the presence detection mode 250, the presence detection mode 250 uses 254 selected sensor types and sensors data to specifically identify moving objects to enable prediction of a specific individual object (typically a person or animal).

The presence detection mode 250 will retrieve existing profiles 256 (as discussed above). The presence detection mode 250 extracts 258 from the existing profiles values for specific parameters that correspond to the types and specific sensors that are being examined as provided by the selected sensors. The presence detection mode 250 determines 260 if there is a sufficiently close match (within a predefined tolerance that is based on expected variation in a value of the parameter) for any of the parameters in the profile. If there is not a match of received sensor data to any stored parameters in the profile, the PDPS 40 retrieves 262 the next profile, if any, and repeats the extract 256 and compare 258 functions. If the presence detection mode 250 finds no matching parameters in any profile, the presence detection mode 250 exits (not shown).

Thus, as used herein "close match" (or the like) corresponds to applying an empirical tolerance or to set out a range of values for some or all of the characteristics detected or sensed by the various sensors, which when compared to an actual reading would produce an indication of a match if within the range or tolerance or not match if outside the range or tolerance. In addition the term "sufficient number of close matches" (or the like) corresponds to a value of the number of matches of characteristics (within the tolerance or range) detected or sensed by the various sensors that are empirically determined or considered as adequate to produce a decision, such as to provide an identity for an individual entity.

For example, to detect a specific presence of an individual it may be considered sufficient that the sensors detect a specific set of characteristics from sensors such as weight, r.f. hotspot, and a chemical signature. The result from an r.f. hotspot may not have a tolerance, meaning that a specific device ID would be required, whereas weight could have a tolerance of, e.g., +/−5%. Chemical signature could have a tolerance that may be more complex than the tolerance assigned to weight. If only two of the sensor signals are detected, it may be considered an insufficient number of close matches and either other sensors would need to confirm or the system would not indicate a specific presence.

However, if the presence detection mode 250 determines that there are one or more matches of parameters to sensor data, the presence detection mode 250 determines 260 the number of parameters in the profile that matched received sensor data, and stores 264 this determination on a profile basis. The PDPS 40 determines 266 whether there are more profiles, if yes, the PDPS 40 retrieves 262 the next profile. When all stored profiles have been examined, the PDPS determines which profile(s) are the most likely matches to the user, that is, the PDPS produces 268 a prediction of the specific presence of an individual.

In the presence detection mode, existing sensor technologies (existing in the sense that these are currently available and/or existing in the sense that these are commonly employed in existing intrusion detection systems, etc.) and their outputs are used with the above algorithm in conjunction with profiles generated by the profile system 42 to form a specific recognition of an individual. For example, a regular motion sensor can detect that there is motion, an audio analyzer in conjunction with a microphone can detect if the motion has an audible signature, a camera can capture what caused the motion, but without detailed recognition or video data leaving the premises, and an IR (infrared) camera can capture an IR signature of the motion and these signals in combination with learned patterns of a specific individual can be used to form a specific presence prediction of a specific individual.

Set out below is a table that contains in rows, groupings (i.e., combinations) of different types of sensors whose signals may be processed by the presence detection system in a manner that can uniquely identify persons and associate the identified persons to specific personal profiles.

| Sensor | Sensor | Sensor | Sensor | Sensor |
|---|---|---|---|---|
| r.f. detector | weight | | | |
| r.f. detector | Audio | | | |
| r.f. detector | LIDAR | | | |
| Weight | sound | Video | | |
| Weight | Motion detector | Audio | | |
| Chemical | Weight | | | |
| Chemical | Weight | | | |
| ECG heartbeat | Weight | | | |
| Optical scan | Weight | | | |
| Heat | Weight | | | |
| Motion detector | Weight | Chemical | | |
| Motion detector | Weight | r.f. detector | | |
| Motion detector | Weight | Audio | | |
| ECG heartbeat | Chemical | | | |
| retina scan | | | | |
| Vibration | Chemical | Weight | Motion | r.f. detector |

As can be seen above depending on the sensor type and the degree of accuracy one (for unique types of sensors such as retina scans) or several sensor combination may be used. The above are merely examples of combinations and of course other sensor types and combinations could be used. Some of the examples include relatively expensive detector technologies, such as cameras and LIDAR whereas other combinations include relatively inexpensive or commonly found technologies such as weight and audio detectors.

Figure 8A:
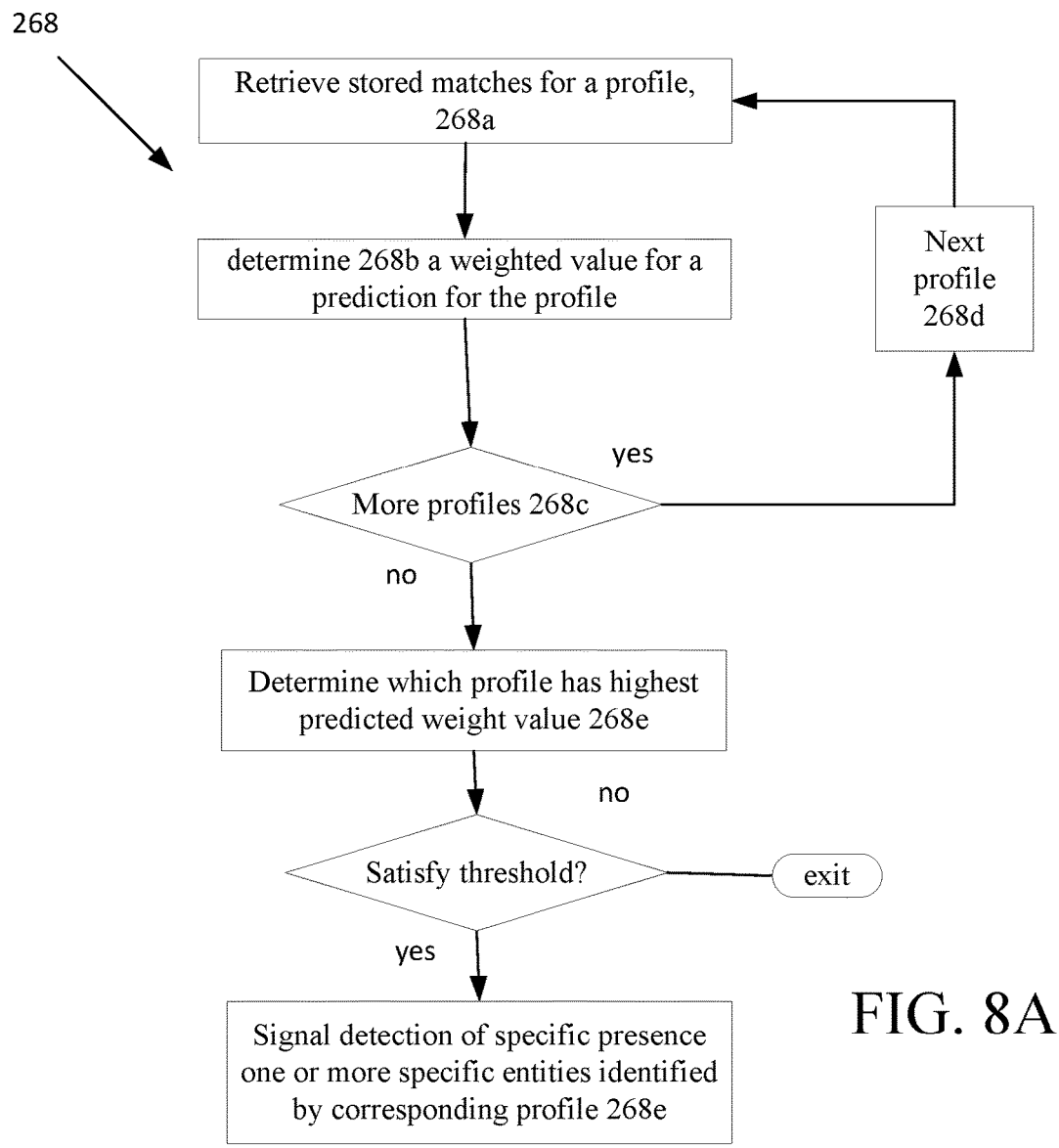
FIG. 8A is a flow chart detailing one of the processes of FIG. 8.

Referring now to FIG. 8A, determination 268 of specific presence includes retrieving 268a stored matches for a profile that was found in FIG. 8 to have one or more parameters sufficiently close to received sensors values. Of course, some parameters in the stored profile are exact matches, e.g., detecting a specific IP address of a user device, whereas others are bounded by an empirically determined range, e.g., a weight value W. For example, the weight value W could be defined by a range of +/−1% or +/−2% or +/−5% for instance of a nominal weight W' or W=W' +/−1%. For the retrieved profile, the determination 268 process determines 268b a weighted value for a prediction for the profile and stores 268c the value, e.g., in association with a profile ID. The process 268 determines 268d if there are more profiles to consider, if yes, retrieves 268e the next profile, and if not, the process 268 determines while profile has the highest weight value 268e, and can optionally compare that highest weight value to a threshold value.

The PDPS 40 executing the determination of predicted specific presence 268 feature (FIG. 8) of the presence detection mode 250 produce results, which can be as in a Table, (below) that stores results of the compare operation 260 (FIG. 8) shown on a per profile ID bases. Some sensors can be a binary value whereas others can be a measured value.

| Profile ID | sensor A | sensor B | sensor C | * * * | sensor n | Prediction (P) |
|---|---|---|---|---|---|---|
| ID 1 | 185 lbs. | IP address X | N | | — | P_ID$_1$ |
| ID 2 | 147 lbs | IP address Y | N | | — | P_ID$_2$ |
| ID 5 | 200 lbs. | N | Y | | — | P_ID$_3$ |
| ID 6 | — | — | — | | — | P_ID$_4$ |

In this example sensor A is a weight sensor; sensor B is a hotspot and sensor C is a chemical sensor.

For a weighted value prediction (P_ID$_n$) a predicted value (P_ID$_1$), can be defined for ID 1 as:

$$P\_ID_1 = w1^*\text{sensor } A + w2^*\text{sensor } B + w3^*\text{sensor } C + \ldots wn^*\text{sensor } n$$

Assuming in an example that P_ID$_1$ is the highest. P_ID$_1$ is thus compared to a threshold and if P_ID$_1$ satisfies the threshold condition 268f, the entity defined by profile P_ID$_1$ is predicted as the specific identified presence 268g. If the P_ID$_1$ does not satisfy the threshold condition 268f the process 268 can exit.

One of the more difficulties with some implementations of intrusion detection and alarm systems is the occurrence of false alarms. Within a premises, a sensor may fire and that sensor may raise an alarm that corresponds to an alarm condition that requires notification of the authorities to investigate. Oftentimes, video and audio technologies may not be incorporated or available at the point of the detected intrusion to validate the presences of a true alarm condition in the premises. The system correlates data from multiple sensors to provide a context into a detection to have the system more accurately determine whether an actual 'alarm' situation exists.

In the context of residential use, a motion sensor is tripped, which absent any other information could cause an alarm to be asserted because of a detected presence or a temperature detector can detect that the temperature of room has suddenly changed or a contact switch can assert a signal indicating that a window has been opened. In the security system, the PDPS 40 applies intelligent analysis on whether an alarm should be asserted based on either the motion sensor being tripped or the temperature detector detecting a rise in temperature of the room or the contact switch asserting a signal indicating that a window has been opened. The PDPS 40 seeks to confirm a potential intrusion by referencing two or more other, different types of sensor signals for confirmation and also retrieves data pertaining to the asserted sensors.

For example, one sensor in a room can also be a sensor that is sensitive to light, and can detect that the sun is shining into the room. The PDPS 40 can retrieve data that indicates that the detected temperature change is the result of normal cycling of climate control systems in the house, or that the PDPS 40 had previously detected via an audio sensor or from a signal from a thermostat and/or furnace that a furnace in the premises has turned on. Alternatively, the PDPS 40 can detect that warm air is coming from a vent. These sensors would tend to mitigate against an increase in the temperature of the room as being an alarm condition. Other sensors such as weight sensors can be used to determine if a body of sufficient weight has been detected in the room. If no weight has been detected in the room or if the weight is that of a pet, the PDPS 40 can retire the alarm condition, having determined that the alleged condition was caused by, e.g., the family pet.

In addition, in the context of residential use, user devices such as smart phones, tablet computers, personal computers and the like, produce different r.f. signatures and some user devices have different unique identifiers. The r.f. detectors can be of various types and can be dispersed within a residence or can be a single detector such as a wireless router, which detectors detect these different signatures to establish presence of a person associated with the device. With an r.f. detection of an authorized user device in the premises, and other confirmation of the presence of the person, the PDPS 40 can likewise retire the asserted signal.

Using Presence Information Collected from Sensors for Minimizing False Alarms

Figure 9:
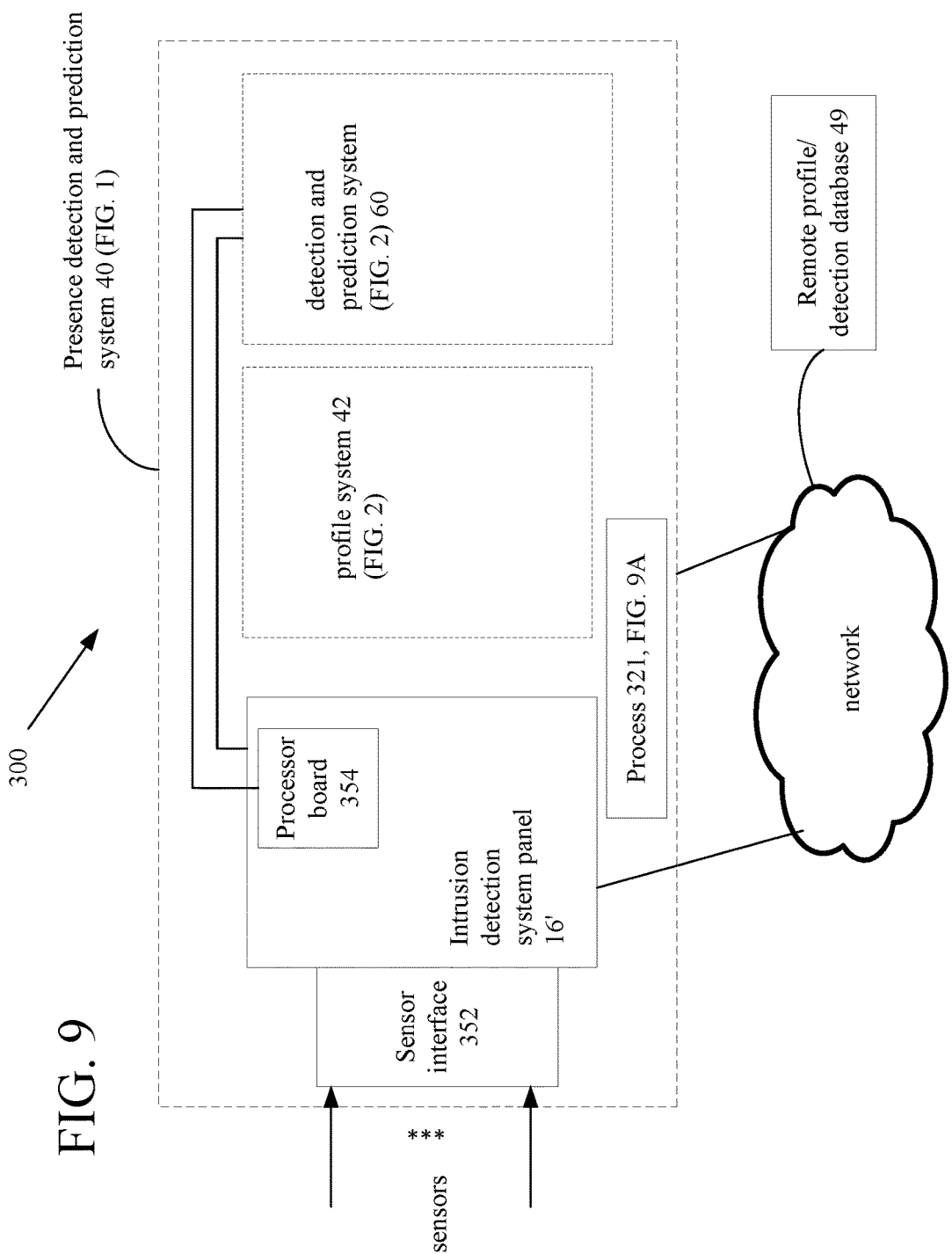
FIG. 9 is a block diagram of an integrated, unified intrusion detection and presence detection/prediction/profiling system.

Referring now to FIG. 9 a unified intrusion detection and PDPS platform 300 that collects data from sensors 28 (via sensor interface 352) for producing alarm events and which uses profile and presence information to minimize false alarms 320 is shown. Although not explicitly shown in FIG. 9, the PDPS system 40 also receives the sensor signals as discussed in FIG. 2. The unified intrusion detection and PDPS platform 300 (unified platform 300) includes in addition to the sensor interface 352 a modified intrusion detection panel 16' that includes a processor board 354 that is configurable by a signal from the PDPS system 40 that can be used to validate potential alarm conditions, as discussed below. The unified platform 300 also includes the profile system 42 and detection and prediction system 60 portions of the PDPS system 40 as discussed in FIG. 2 including network 50 and remote profile/detection database 49. As discussed above, one of the difficulties with some implementations of intrusion and alarm systems is the relatively high occurrence of false alarms. The unified platform 300 uses signals from the inexpensive and non-intrusive, e.g., privacy-aware, technologies discussed above to detect and recognize presence of specific individuals and uses analytics for discerning between occurrences of false alarm conditions and true alarm conditions. For instance, alarm conditions can occur when a motion sensor is tripped, by a moving object that is not indicative of an intruder, e.g., by a resident or authorized person or by a pet or wind blowing a drape, etc. with the system being armed. Absent other information tripping of the motion sensor could cause an alarm to be asserted because the sensor detected a moving object. The unified intrusion detection panel 16' via the processor board 354 detects a potential alarm event(s) from the firing of various sensors. Upon occurrence of the potential alarm event(s) and prior to issuance of the alarm, the panel 16' signals the PDPS 40 in the unified platform 300. The unified platform 300 uses presence information and analysis to determine whether an alarm should be asserted.

Figure 9A:
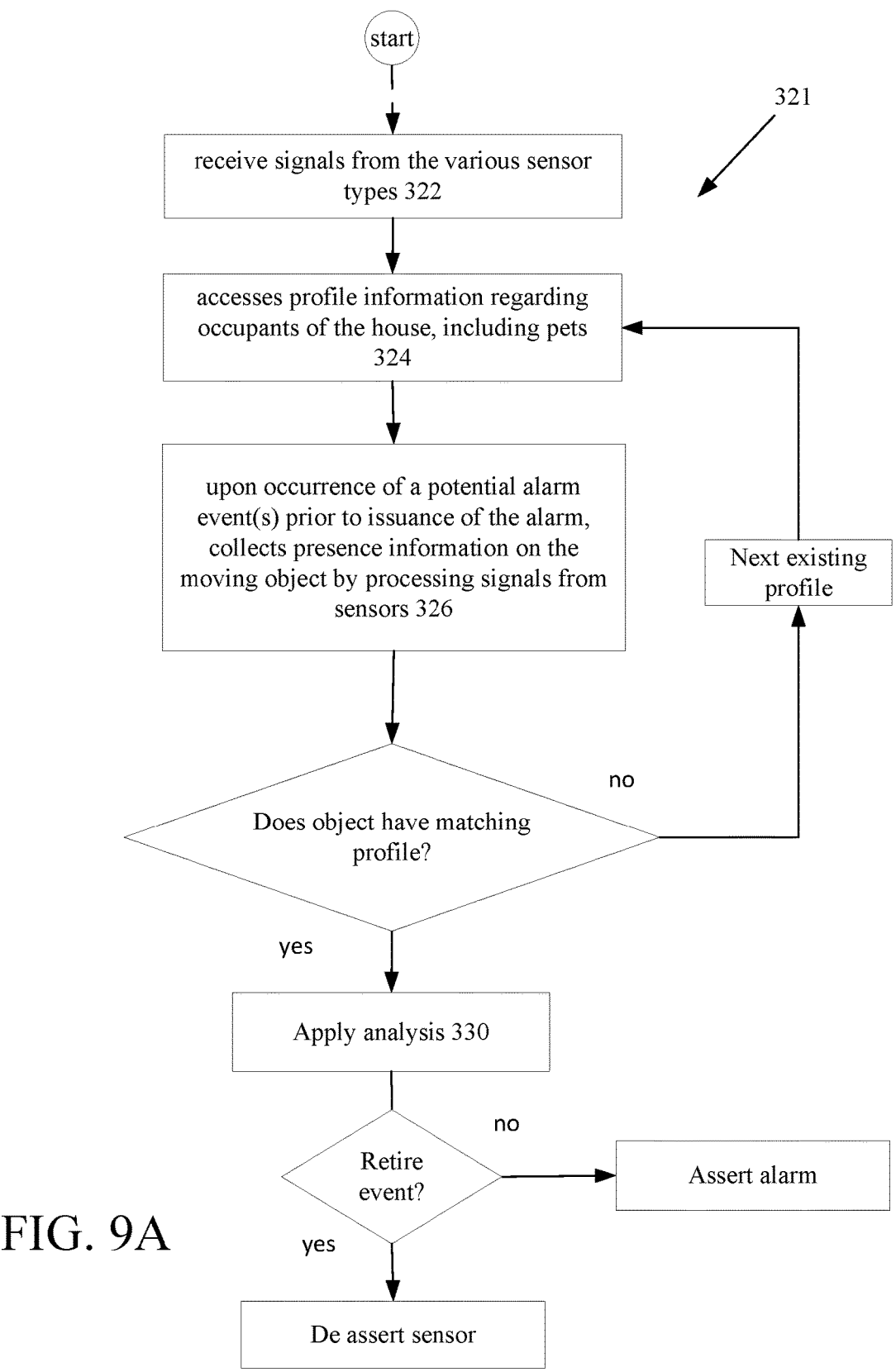
FIG. 9A is a flow chart detailing one of the processes of in the system of FIG. 9.

Referring now to FIG. 9A, a process 321 for minimizing the occurrence of false alarms in intrusion detection systems is shown. In some embodiments, the unified platform 300 receives 322 signals from the various sensor types, e.g., the inexpensive and non-intrusive, e.g., privacy-aware, technologies discussed above to detect and recognize presence of specific individuals. Conventionally, use of video and audio technologies with appropriate recognition software, e.g., facial and/or voice, can be used to recognized the presence of specific individuals. However, some persons may find such approaches extremely intrusive, i.e., non-privacy aware and these approaches may be more costly.

The unified intrusion detection and PDPS 40 platform, accesses 324 profile information regarding occupants of the house, including pets. As mentioned this information is in profile records and includes some or all personal information such as name, age, weight, gender, height, eye color, hair color, etc., as well as type of entity, e.g., resident, frequent visitor, pet, etc. The physical attributes are either inputted by the user or discerned from sensors. The unified intrusion detection panel 16' via the processor board 354 detects a potential alarm event(s) from the firing of various sensors. Upon occurrence of the potential alarm event(s) and prior to issuance of the alarm, the panel 16' signals the PDPS 40 in the unified platform 300. The unified platform 300 collects 326 presence information on the moving object by processing signals from sensors, as discussed above in FIGS. 1-8. This presence information is compared to existing profile information 328 and if there are matches to the existing profile information, the unified intrusion detection and PDPS 40 platform applies analysis 330 that examines what profile was matched, historical patterns, sensors that were tripped, etc. to determine whether to actually send the alarm condition. If the object does not have any matches to an existing profile the unified intrusion detection and PDPS 40 platform gets the next existing profile 329.

For instance, some sensors may send signals indication that a moving object was detected, however the object detected was the family pet. If the family pet has a profile in the PDPS 40, the unified platform can determine that this is a false alarm and avoid or delay sending assertion of an alarm until other confirmation from other sensors is received.

Thus, the PDPS 40 applies intelligent analysis 330 on whether an alarm should be asserted based on the motion sensor being tripped. The PDPS 40 rather than seeking confirmation of a potential intrusion by referencing two or more other, different types of sensor signals relies on the processing of the profile and presence information. The profile and presence information provides an indication of what triggered the alarm. Of instance, if the profile and presence information as processed by the PDPS 40 determines that the alarm was triggered by movement of a family pet or the presence of authorized persons in the premises the PDPS 40 signals the processor to retire 331 the event and an alarm would not be issued 332 as such pet or persons most likely caused assertion of the alarm The PDPS 40 would not retire the event and would signal 333 the panel 16' to assert the alarm when countervailing considerations applied, such as, tripping of other alarms or the presence of unidentified or unauthorized individuals or an inability of the PDPS 40 to ascertain that the presence of authorized entities actually caused the event or that the PDPS 40 cannot otherwise correlate the detected presence to the event. In these instance the PDPS 40 would not seek confirmation of a potential intrusion after processing of the profile and presence information but rather would signal the intrusion detection system to assert the alarm.

Such intrusion detection system thus would be modified to take into consideration in any filter processing of potential alarm conditions the relative importance of presence information as processed by the PDPS 40. This modification can be an override of the alarm event assertion or merely an input into processing of the event by the intrusion detection system. While the PDPS 40 may retire the event and signal the panel 16' to not assert the alarm, either the PDPS 40 and/or the panel 16' can store the event for subsequent assertion based on a confirmation from other sensors.

For example, one sensor in a room can be a sensor that is sensitive to vibration, and the PDPS 40 can detect the absence of a presence of any entity in the room. Alternatively, the PDPS 40 can detect that warm air is coming from a vent that moved drapes that caused the motion sensor to trip. The false alarms thus would be confirmed by the absence of a presence of an entity such as through no increases in the temperature of the room, no weight sensors detecting a presence in the room, etc. Alternatively, if weight has been detected in the room but is that of a pet, as verified by the profile information, the PDPS 40 can retire the alarm condition, having determined that the alleged condition was caused by, e.g., the family pet.

Figure 10:
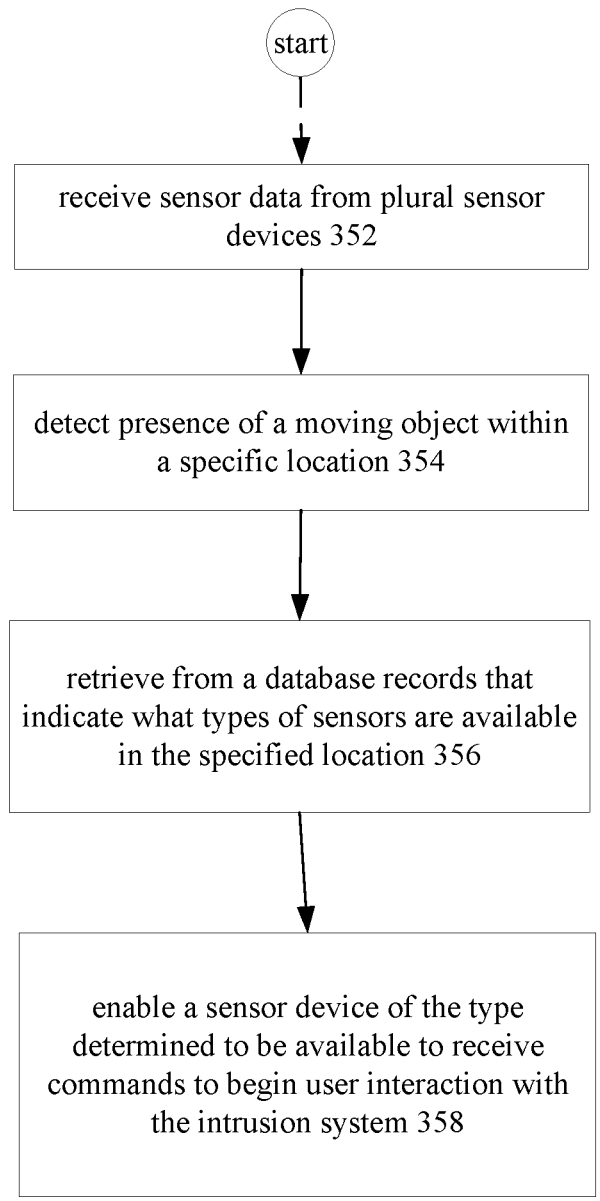
FIG. 10 is a flow chart detailing user interaction.

Using Presence Information Collected from Sensors for Simplified User Interaction Referring now to FIG. 10, the unified intrusion detection and PDPS 40 platform 330 (FIG. 9) also includes a process 350 that simplifies user interaction with the system based on collected data from sensors and presence information. The PDPS 40 can be instrumental in simplifying user interaction with the intrusion system 12 via the panel 16'. The PDPS 40 senses user activity and identification of the user to configure the intrusion system. Specifically for user interaction, the use of a remote sensor can act as a 'trigger' event to enable user interaction with the intrusion detection system 12, such as by voice commands from specific persons.

For example, signals from multiple sensors are received 352 by the PDPS 40. These sensor signals are processed 354 by the PDPS 40 to detect the presence of a moving object in a specific location in the premises. The specific presence and the location are determined as above, e.g., by the processing of FIGS. 8, 8A and by the PDPS 40 determining what room/location the user is in by knowing what sensors are in which locations in the premises. The PDPS retrieves home "profile" data that specifies locations of various sensors, layouts of rooms, equipment in the home, devices/systems that can be electronically controlled, IP addresses of such system/devices, etc.

Once the PDPS 40 has determined that an occupant is in a particular room, the PDPS 40 determines 356 what mechanisms are available in that room to communicate with the PDPS 40 and the intrusion detection system. For example, the PDPS 40 determines that only voice input via microphone is available to interact with the intrusion system 12, so the PDPS 40 enables 358 a microphone in that room to listen for key words to begin user interaction with the intrusion system.

Thus, the PDPS 40 includes the described hardware and a scalable software platform that collects via the sensors environmental data that are processed by a centralized analytical engine. The analytical processing is based on software algorithms in combinations with the sensor information that generate event/timing messages/signals to control home devices (such as switches, controllers, remotes, small appliances, entertainment systems, motors, etc.) without the direct intervention of the homeowner. An example of this could be: as the home owner approaches the home, the PDPS 40 detects presence of an entity, determines specific identity of the detected entity as discussed above, and based on the determine specific presence, triggers events that operate with various devices/systems within the home, which events are based on learned habits of that specific entity.

Using Presence Information Collected from Sensors for Replicating of Pattern of Activity, Family Monitoring and Alarm Events.

Figure 11A:
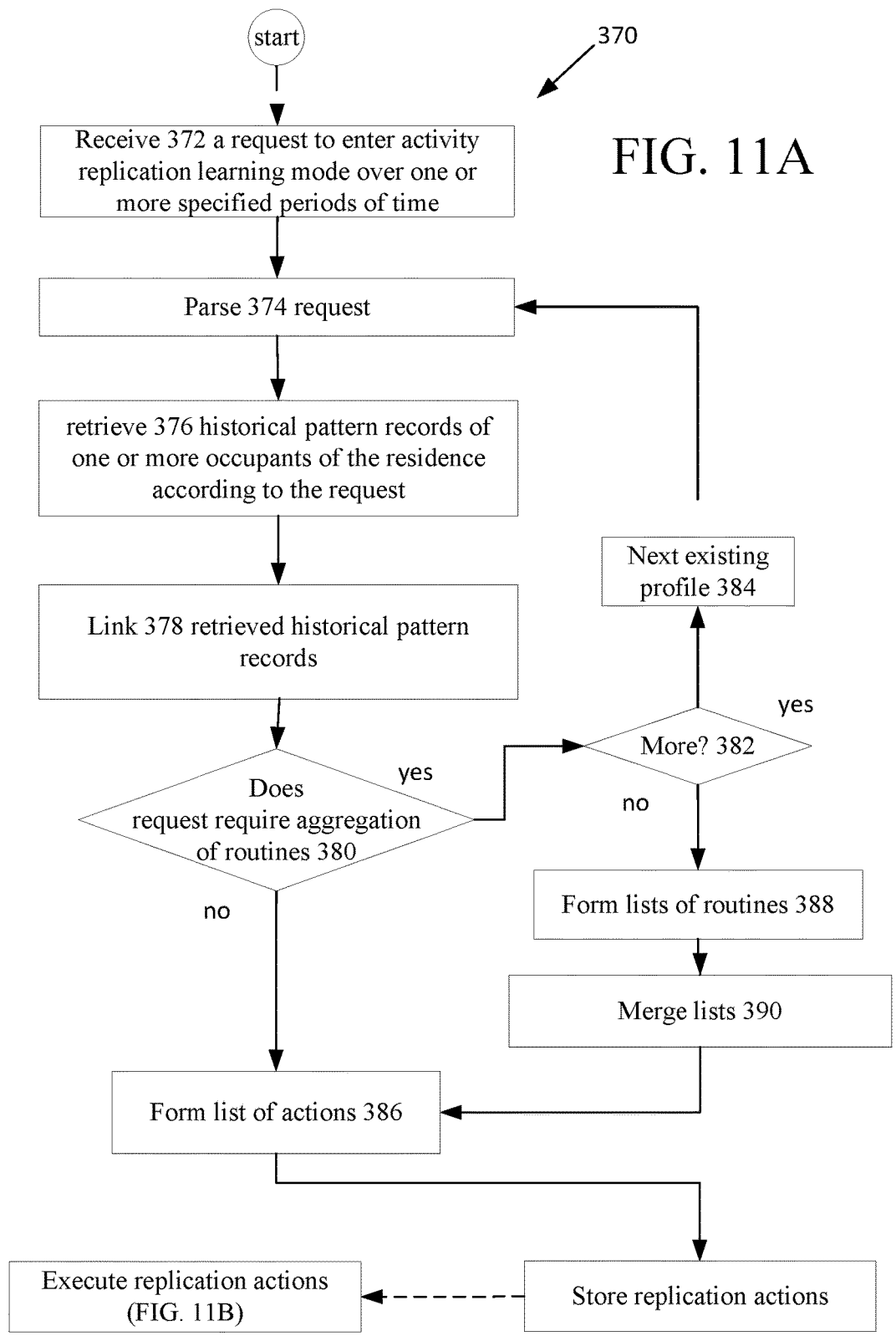
FIGS. 11A and 11B are flow charts detailing activity replication.

Referring now to FIG. 11A, a process 370 that uses presence information collected from sensors for replicating of patterns of activity is shown. In process 370, the process 370 may receive 372 a request for operating in an activity replication learning mode over one or more specific periods of time. The request can be entered via a user interface and can include specific times/days of the week and/or seasons or can be a ubiquitous request that covers an entire day, week, etc.

Figure 11B:
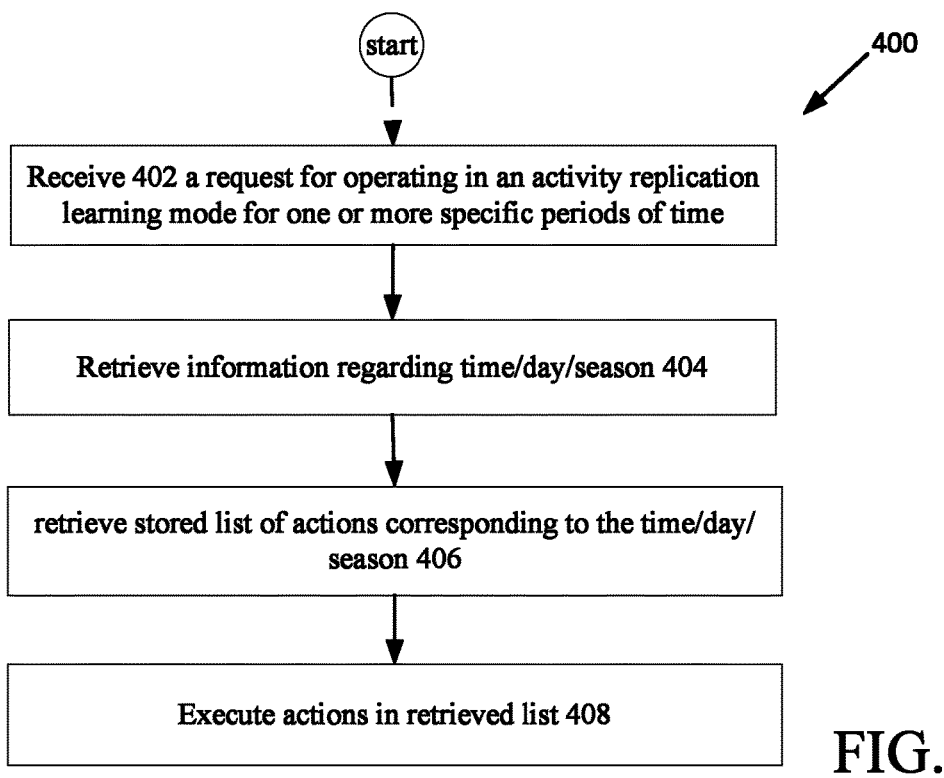

The PDPS 40 parses 374 this request, and retrieves 376 historical pattern records discussed above according to the parsed request. Retrieval of historical pattern records can be on a profile bases or over a period of time basis. The historical pattern records are repositories of patterns of activity in a house over periods of time. The PDPS 40 can provide overall patterns of activity by linking 378 together selected ones of these historical pattern records. These linked historical patterns can be stored and retrieved (not explicitly shown at this point in FIG. 11A) to replicate activity when the PDPS 40 is placed in an activity replication mode (FIG. 11B).

Alternatively, as shown in FIG. 11A, the process 370 can be more complex. The process 370 can examine the parsed request to determine what actions will be replicated by several individuals over the specified period(s) of time. Thus the process 370 determines whether the request requires aggregating 380 of routines of several individuals. If so, the process will continue to retrieve profile records 384 and corresponding historical pattern records of occupants until all profiles have been processed 382. When all profiles/routines have been processed, the process 370 forms 388 lists of routines, merges the lists 390 and form lists of actions 386. The process 370 stores 392 lists of such replicated actions that correspond to a replicated pattern. Replication of action patterns are provided from the production of the listing 386 of actions that are provided from the formed 388 lists of routines for several individuals, which lists are merged 390. The lists include control actions that are initiated by the PDPS 40 (see 400 FIG. 11B) to replicate actions of one or more of the individuals in the premises. This listing includes information such as depicted in the table below:

| Device/System ID | Action | Time |
| --- | --- | --- |
| Television in child's #1 room | Turn on | 4:00 pm |
| Television in child's #2 room | Turn on | 4:30 pm |
| Kitchen lights | Turn on | 4:30 pm |
| * * * | * * * | * * * |
| Television in child's #1 room | Turn off | 8:00 pm |
| Television in child's #2 room | Turn off | 8:30 pm |
| Kitchen lights | Turn off | 10:30 pm |

The above table is merely a simple listing of possible actions. For example, the device system ID can include e.g., a IP address of a device that controls the listed device/system, details on formats of messages and how to interface with the specific device. The PDPS 40 can control for instance, lights in various rooms, televisions and other media devices, etc. to give an external observer a notion of presence of humans in the house. The PDPS 40 thus keeps those historical patterns active so the house looks lived in even when the occupants are not home. The lists can be labeled according to time/day/season, etc.

Referring now to FIG. 11B, a person configures the PDPS 40 in the intrusion detection system to operate in a replication mode 400. In the replication mode 400, the PDPS 40 receives a request 402, retrieves 404 information regarding the current time and day of the week. The PDPS 40 retrieves 406 the lists of actions and executes 408 the actions by the PDPS 40 producing replication of activities according to the current time and day of the week (and season). The PDPS 40 applies each or at least one of the actions from the list to the premises. That is, the PDPS 40 accesses the appropriate stored list (see exemplary table above) retrieves a first control action from the list, initiates the control action (by sending the appropriate control message/signal to the device) at the appropriate time and day of the week, etc. to replicate that action in the premises.

The PDPS 40 also detects patterns to aid in configuring the intrusion system. The PDPS 40 retrieves historical pattern information to aid in configuration of the intrusion system. For example, the system will periodically retrieve historical pattern information records, for a current time/day and determine whether the retrieved historical pattern information bears any relevance to configuration of or control of the intrusion system. As an example, the PDPS 40 can execute a rule to ARM the intrusion system. The rule can be "if occupants turn of < > light(s) in a < > room(s) at or around a < > time cause the PDPS 40 to ARM the security system. The parameters of the specific lights, specific room(s) and time are derived from the retrieved historical pattern information for that time. The retrieved historical pattern information can also be used to detect unusual patterns that may provide context for raising security awareness or an alarm.

By replicating stored patterns of activity, the PDPS 40 can enable a house to appear to an outside observer as being occupied by individuals, when in fact the house is unoccupied. As the PDPS 40 continually collects information regarding normal behavioral patterns in a premises, the PDPS 40 uses this historical information to replicate one or more of these patterns to present an impression of human presence and activity in a home, when it fact there is none.

Figure 12:
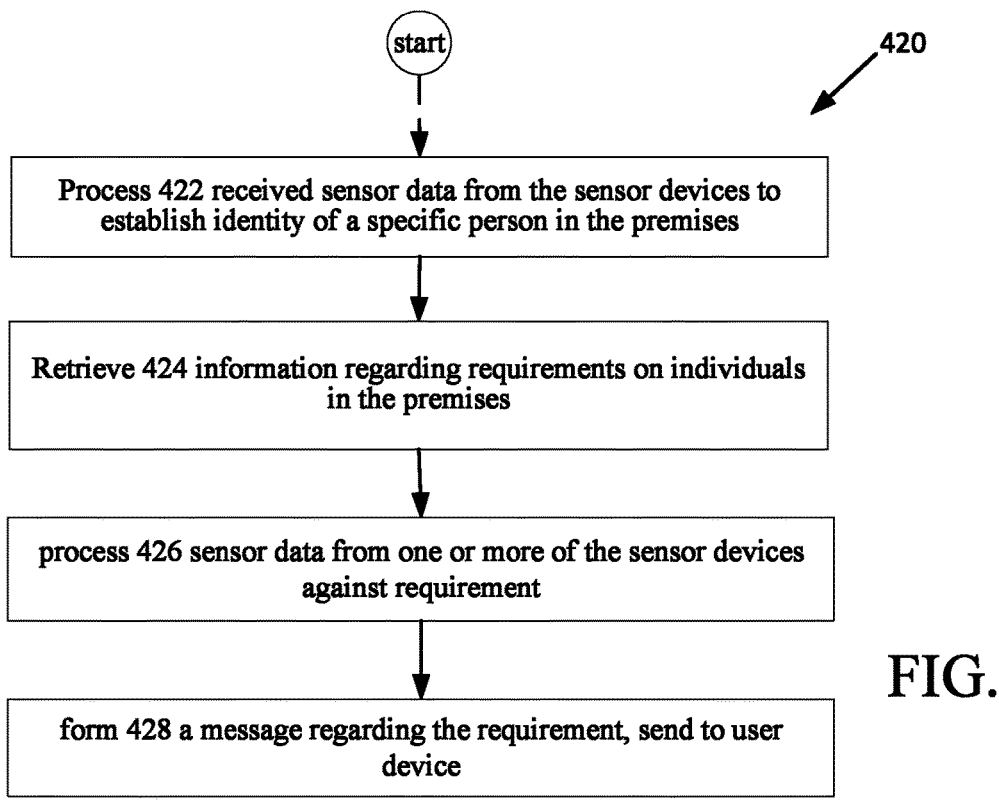
FIG. 12 is a flow chart depicting monitoring.

Referring now to FIG. 12, the processing discussed above can be tailored for monitoring 420 specific family members such as children and the elderly, as well as family pets, and so forth. By combining activity records and location data the PDPS 40 uses presence information to determine if there is adequate activity, and uses location data to determine if individuals are in locations where they should be or are in locations where they should not be. This process can include processing with respect to family pets as well. The monitoring process 420 receives 422 sensor data from the sensor devices and the PDPS 40 establishes identity of a specific person in the premises, as discussed above. The PDPS 40 retrieves 424 information regarding requirements on individuals in the premises and processes sensor data from one or more of the sensor devices against the requirement. The PDPS 40 forms a message regarding the requirement for the particular user and sends the message to a user device. For example, the PDPS 40 can detect through the sensor data that a specific family member such as child is in the basement of a house, which has been defined by a parent as off limits to the child. The PDPS 40 can generate a message that is sent to the parent's smartphone for instance indicating that sensors in the basement detected the presence of the child in the basement.

Figure 13:
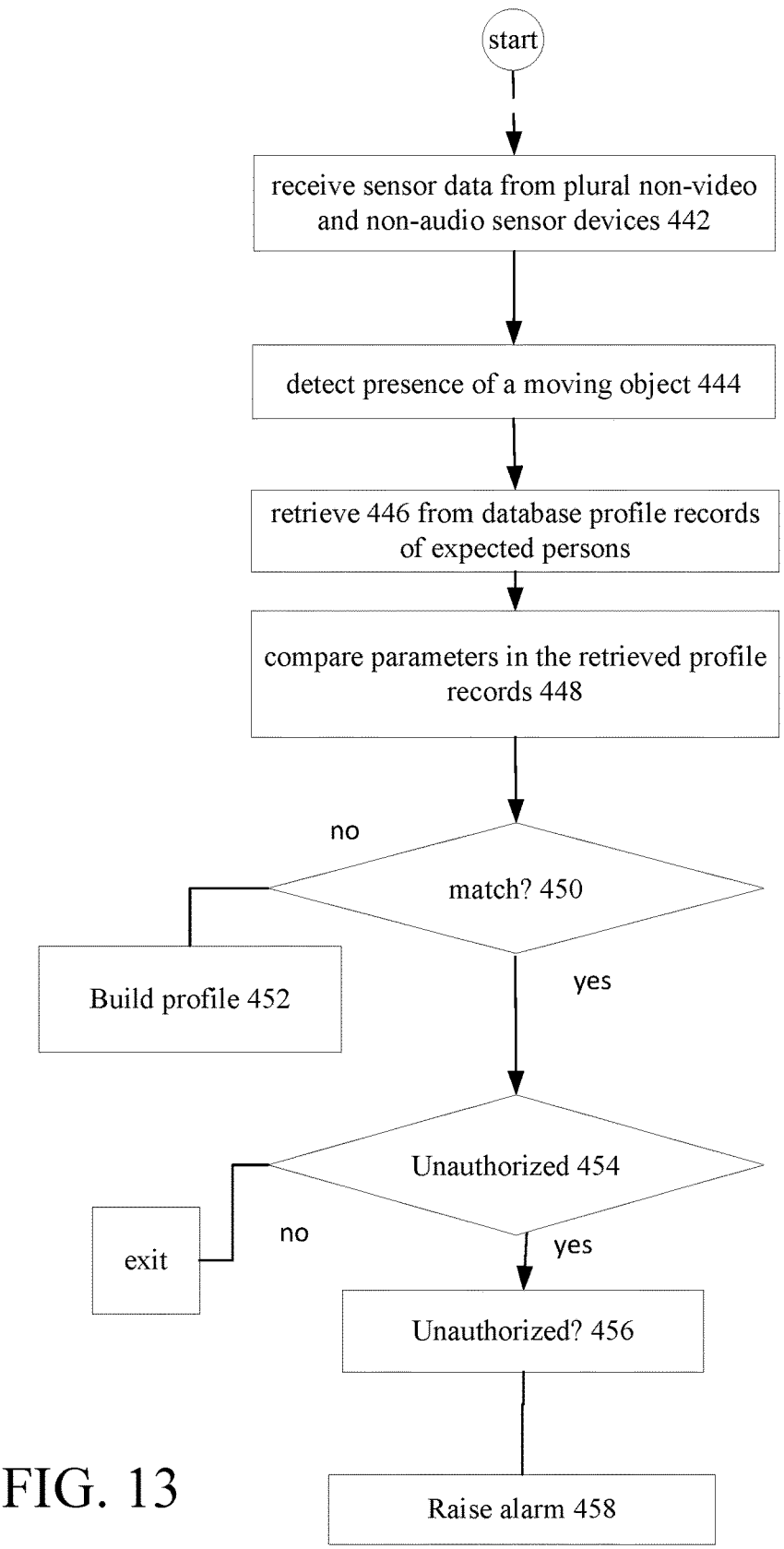
FIG. 13 is a flow chart for detecting alarm events in the integrated intrusion detection and presence detection/prediction and profiling system platform.

Referring now to FIG. 13 techniques 440 for detecting alarm events in the unified intrusion detection and PDPS platform 300 include collecting 442 data from sensors and producing by the PDPS platform 300 from the collected sensor data, presence information. The above mentioned inexpensive and/or non-intrusive, e.g., privacy-aware, sensor technologies are used to detect and recognize presence of specific individuals as discussed above. The profiles of each of these individuals are stored in a database and the PDPS platform 300 produces a listing of individuals expected to be in the premises at any particular time. While conventionally, use of video and audio technologies with appropriate recognition software, e.g., facial and/or voice, can be used to recognized the presence of specific individuals, some users may find such approaches extremely intrusive, i.e., non-privacy aware.

The PDPS has a presence detection mode that can detect the presence of and 'identification' of people in the premise. The PDPS, upon detecting 444 presence of a moving object, e.g., a person retrieves 446 profiles of 'expected' people. The presence detection system also extracts feature data from various sensors and compares parameters in the retrieved profile records 448 to feature data from various sensors to determine 450 whether there are any matches of features of that person with corresponding features of expected people. If there are no matches to any profiles the PDPS 40 can build a new profile. For a matching profile, the process 450 determines 454 whether a person is unauthorized, and identifies 456 when an unidentified person has been detected and raises an alarm 458.

However, rather than the PDPS performing this processing, the PDPS can send the profiles of expected people and raw sensor data collected from a detected individual to a third party monitoring service and the third party monitor service will attempt to match features from the raw sensor data with features in the profiles and raise an alarm if there were no matches. In this presence detection mode, signals from plural, different types of sensors are processed and used to recognize the presence of specific individual(s). The PDPS receives signals from various sensors, of various types as described above. In the presence mode, the PDPSs uses selected sensor types and sensors data to specifically identify moving objects to enable prediction of a specific individual object (typically a person or animal).

The PDPS will retrieve existing profiles (as discussed above). The PDPS will extract from the existing profiles values for specific parameters that correspond to the types of data provided by the selected sensors. The PDPS determines if there is a sufficiently close match (within a predefined tolerance that is based on expected variation in a value of the parameter). Table 1 above of sensor types are exemplary of sensors that can be used in unison to detect specific presence of individual moving objects.

An example monitoring station can be a single physical monitoring station or center in FIG. 1. However, it could alternatively be formed of multiple monitoring centers/stations, each at a different physical location, and each in communication with the data network. The central monitoring station 18 includes one or more monitoring server(s) each processing messages from the panels and/or user devices of subscribers serviced by the monitoring station.

Optionally, a monitoring server may also take part in two-way audio communications or otherwise communicate over the network, with a suitably equipped interconnected panel and/or user device.

The monitoring server may include a processor, a network interface and a memory (not shown). The monitoring server may physically take the form of a rack mounted card and may be in communication with one or more operator terminals. An example monitoring server is a SURGARD™ SG-System III Virtual, or similar receiver.

The processor of each monitoring server acts as a controller for each monitoring server, and is in communication with, and controls overall operation, of each server. The processor may include, or be in communication with the memory that stores processor executable instructions controlling the overall operation of the monitoring server. Suitable software enabling each monitoring server to authenticate users for different security systems, determine whether a requested control action can be performed at the security system based on the location of a user device from the request is sent, or to perform other functions may be stored within the memory of each monitoring server. Software may include a suitable Internet protocol (IP) stack and applications/clients.

An example user device includes a display and a keypad and in some implementations, the user device is a smart phone. The keypad may be a physical pad, or may be a virtual pad displayed in part of the display. A user may interact with the application(s) run on the user device through the keypad and the display. The user device also includes a camera, a speaker phone, and a microphone.

Structurally, the user device also includes a processor for executing software instructions and perform functions, such as the user device's original intended functions, such as cell phone calls, Internet browsing, etc., and additional functions such as user authentication processes for a security system, communications with the security system and/or the monitoring station of the security system, and/or applications of the geographical limitations to control actions to be performed by the security system. A memory of the user device stores the software instructions and/or operational data associated with executing the software instructions. Optionally, the instructions and the data may also be stored in a storage device (not shown) of the user device. The user device also includes one or more device interfaces that provide connections among the different elements, such as the camera, the display, the keypad, the processor, the memory, etc., of the user device. The user device further includes one or more network interfaces for communicating with external network(s), such as the network of FIG. 1, and other devices.

Memory stores program instructions and data used by the user devices and servers. The stored program instructions may perform functions on the user devices. The program instructions stored in the memory further store software components allowing network communications and establishment of connections to a network. The software components may, for example, include an internet protocol (IP) stack, as well as driver components for the various interfaces, including the interfaces and the keypad. Other software components such as operating systems suitable for operation of the user device, establishing a connection and communicating across network will be apparent to those of ordinary skill.

Although certain embodiments of the methods and systems are described, variations can be included into these embodiments, or other embodiments can also be used. Other embodiments are within the scope of the following claims.

What is claimed is:

1. A system comprising at least one computing device including at least one processor and at least one memory, the at least one computing device configured to implement:
   an intrusion detection system detecting intrusions to a premises based on sensor data received from non-video and non-audio sensor devices that produce the sensor data in response to measuring physical characteristics of a person; and
   a presence detection system operatively coupled to the intrusion detection system and configured to:
      retrieve profiles of one or more persons, each profile including respective physical characteristics of a respective person;
      compare the sensor data to corresponding values in the profiles to determine one or more matching physical characteristics and identify the person thereby;
      retrieve premises profile data specifying layout information for the premises, locations of the non-video and non-audio sensor devices, electronically controllable systems, and Internet Protocol (IP) addresses of the electronically controllable systems;
      determine a current location of the identified person in the premises based on the locations of the non-video and non-audio sensor devices that produced the sensor data; and
      determine actions that the identified person is authorized to perform to control the intrusion detection system and the electronically controllable systems in the premises.

2. The system of claim 1, wherein the presence detection system is further configured to:
   send one or more signals to the intrusion detection system or the electronically controllable systems to perform the actions.

3. The system of claim 1, wherein the presence detection system is further configured to:
   determine a mechanism available in the current location by which the identified person can communicate with the presence detection system; and
   enable the mechanism in the current location to communicate with the presence detection system.

4. The system of claim 3, wherein the mechanism comprises a microphone at the current location.

5. The system of claim 1, wherein the presence detection system is further configured to:
   determine a user activity providing a trigger event to enable user interaction with the intrusion detection system.

6. The system of claim 5, wherein the enabled user interaction with the intrusion detection system is by voice commands from the identified person.

7. The system of claim 1, further comprising the non-video and non-audio sensor devices.

8. The system of claim 1, wherein the presence detection system is operatively integrated into the intrusion detection system.

9. The system of claim 1, wherein the presence detection system is operatively integrated into the intrusion detection system and the presence detection system receives the sensor data from the non-video and non-audio sensor devices, with at least one of the non-video and non-audio sensor devices being motion, glass breakage, gas leaks, fire, breach of an entry point, temperature, sound, weight, pressure, chemical sensors.

10. The system of claim 1, wherein the presence detection system is configured to identify from processing of the sensor data from the non-video and non-audio sensor devices the identified person by being configured to:
   determine a match within an empirically determined tolerance or a set of ranges of values for at least some characteristics detected or sensed by the non-video and non-audio sensor devices and the corresponding values in the profiles.

11. A method performed by a presence detection system that is operatively coupled with an intrusion detection system, comprising:
   receiving sensor data from the intrusion detection system, wherein the intrusion detection system detects intrusions to a premises based on the sensor data received from non-video and non-audio sensor devices that produce the sensor data in response to measuring physical characteristics of a person;
   retrieving profiles of one or more persons, each profile including respective physical characteristics of a respective person;
   comparing the sensor data to corresponding values in the profiles to determine one or more matching physical characteristics and identify the person thereby;
   retrieving premises profile data specifying layout information for the premises, locations of the non-video and non-audio sensor devices, electronically controllable systems, and Internet Protocol (IP) addresses of the electronically controllable systems;
   determining a current location of the identified person in the premises based on the locations of the non-video and non-audio sensor devices that produced the sensor data; and
   determining actions that the identified person is authorized to perform to control the intrusion detection system and the electronically controllable systems in the premises.

12. The method of claim 11, further comprising:
   sending one or more signals to the intrusion detection system or the electronically controllable systems to perform the actions.

13. The method of claim 11, further comprising:
   determining a mechanism available in the current location by which the identified person can communicate with the presence detection system; and
   enabling the mechanism in the current location to communicate with the presence detection system.

14. The method of claim 11, further comprising:
   determining a user activity providing a trigger event to enable user interaction with the intrusion detection system.

15. The method of claim 14, wherein the enabled user interaction with the intrusion detection system is by voice commands from the identified person.

16. The method of claim 11, wherein the presence detection system is operatively integrated into the intrusion detection system.

17. The method of claim 13, wherein the mechanism comprises a microphone at the current location.

18. The method of claim 11, wherein the presence detection system is operatively integrated into the intrusion detection system and the presence detection system receives the sensor data from the non-video and non-audio sensor devices, with at least one of the non-video and non-audio sensor devices being motion, glass breakage, gas leaks, fire, breach of an entry point, temperature, sound, weight, pressure, chemical sensors.

19. The method of claim 11, further comprising:
   determining a match within an empirically determined tolerance or a set of ranges of values for at least some characteristics detected or sensed by the non-video and non-audio sensor devices and the corresponding values in the profiles.

20. The system of claim 4, wherein the presence detection system is further configured to receive voice commands from the identified person via the microphone.

21. The system of claim 1, wherein the non-video and non-audio sensor devices comprise a weight sensor installed at the premises, wherein the physical characteristics of the person comprise a weight of the person measured by the weight sensor.

* * * * *